United States Patent [19]
Fujino et al.

[11] Patent Number: 5,708,538
[45] Date of Patent: Jan. 13, 1998

[54] DRIVE ARRANGEMENT FOR BOTH A CASSETTE LOADING MECHANISM AND A TAPE LOADING MECHANISM OF A RECORDING AND REPRODUCING APPARATUS

[75] Inventors: Toyomi Fujino; Hideki Nonoyama, both of Kanagawa; Tsutomu Toyoguchi, Tokyo, all of Japan

[73] Assignee: Sony Corporation, Tokyo, Japan

[21] Appl. No.: 926,190

[22] Filed: Aug. 7, 1992

Related U.S. Application Data

[63] Continuation of Ser. No. 476,871, Feb. 8, 1990, abandoned.

[30] Foreign Application Priority Data

Feb. 10, 1989 [JP] Japan ................................. 1-32274

[51] Int. Cl.$^6$ ..................... G11B 15/675; G11B 15/665
[52] U.S. Cl. .................................. 360/96.5; 360/95
[58] Field of Search ........................... 360/96.5, 96.6, 360/96.3, 93, 94, 95

[56] References Cited

U.S. PATENT DOCUMENTS

| | | | |
|---|---|---|---|
| 4,654,730 | 3/1987 | Fleck et al. | 360/96.5 |
| 4,685,009 | 8/1987 | Min et al. | 360/95 |
| 4,704,643 | 11/1987 | Matsuoka et al. | 360/95 |
| 4,752,844 | 6/1988 | Suzuki | 360/95 |
| 4,782,407 | 11/1988 | Hwang | 360/85 |
| 4,800,449 | 1/1989 | Yamasaki | 360/71 |
| 4,866,550 | 9/1989 | Ohashi | 360/94 |
| 4,881,137 | 11/1989 | Meguro et al. | 360/96.5 |
| 4,933,790 | 6/1990 | Mitumaru | 360/96.5 |
| 4,951,164 | 8/1990 | Yasaka et al. | 360/95 |
| 4,965,683 | 10/1990 | Otani | 360/96.6 |
| 4,985,791 | 1/1991 | Yamagishi | 360/96.5 |
| 5,008,766 | 4/1991 | Chigasaki | 360/96.5 |
| 5,025,332 | 6/1991 | Tsuchida | 360/95 |

FOREIGN PATENT DOCUMENTS

| | | | |
|---|---|---|---|
| B-84924/82 | 11/1984 | Australia . | |
| B-77492/81 | 4/1985 | Australia . | |
| B-40764/85 | 2/1989 | Australia . | |
| B-57539/86 | 7/1989 | Australia . | |
| 0 317 370 A2 | 5/1989 | European Pat. Off. . | |
| 61-123045 | 6/1986 | Japan | 360/96.5 |
| 61-210552 | 9/1986 | Japan | 360/96.6 |
| 62-67763 | 3/1987 | Japan | 360/96.6 |
| 0219041 | 4/1987 | Japan | 360/96.6 |
| 2137796 | 10/1984 | United Kingdom . | |
| 2149187 | 6/1985 | United Kingdom . | |

*Primary Examiner*—Craig A. Renner
*Attorney, Agent, or Firm*—Hill, Steadman & Simpson

[57] ABSTRACT

A recording and/or reproducing apparatus for recording and/or reproducing information signals with the use of a tape cassette having a pair of tape reels which are engaged on reel shafts of the apparatus includes a tape cassette transfer mechanism for shifting the tape cassette inserted by way of a cassette insertion opening in a first direction normal to the reel shafts and then parallel to the reel shafts to place the pair of tape reels within the tape cassette on the shafts. The apparatus includes a drive arrangement having a single motor that drives both a cassette transfer arrangement and a movable tape loading control arrangement which is disposed in the apparatus for extracting a portion of the tape of the cassette and guiding an extracted portion of the tape along a predetermined path.

10 Claims, 24 Drawing Sheets

DRIVE ARRANGEMENT FOR BOTH A CASSETTE LOADING MECHANISM AND A TAPE LOADING MECHANISM OF A RECORDING AND REPRODUCING APPARATUS

This is a continuation of application Ser. No. 07/476,871, filed Feb. 8, 1990, now abandoned.

BACKGROUND OF THE INVENTION

This invention relates to a loading mechanism for a recording and/or reproducing apparatus for recording and/or reproducing information signals on or from a tape, such as a magnetic tape, accommodated within a tape cassette. More particularly, it relates to a recording and/or reproducing apparatus for recording and/or reproducing information signals using a tape cassette, which apparatus is provided with a pair of reel shafts each having an engaging member mounted with a bias towards the end of a supporting shaft, and a tape cassette transfer mechanism adapted for shifting the tape cassette inserted by way of the cassette inserting opening in a first direction normal to the reel shafts and guiding or loading the tape cassette for inserting and engaging the reel shafts with a pair of tape reels within the tape cassette.

The recording and/or reproducing apparatus in which information signals, such as audio or video signals, are recorded on a magnetic tape, which is wound between a pair of tape reels rotatably accommodated within the tape cassette, or the thus recorded information signals are reproduced from the tape, are in the current use. As one of such recording and/or reproducing apparatus, a digital audio tape recorder or DAT has been proposed, in which a tape cassette accommodating a magnetic tape as the recording medium is provided and digital audio signals are recorded on or reproduced from the magnetic tape in the tape cassette.

The tape cassette employed in the digital tape recorder is of a tightly sealable structure to protect the magnetic tape contained in the cassette body during storage or the like non-use period when the tape cassette is not attached in position within the digital audio tape recorder.

A tape cassette, generally indicated at 300 in FIGS. 1 and 2, is employed in the digital audio tape recorder. The tape cassette 300 has a main or cassette body 301 formed by a pair of upper and lower halves 301a, 301b abutted to each other, and a pair of tape reels 302, 303 are rotatably supported within the cassette body 301. A tape 304, such as a magnetic tape, is installed between these tape reels 302, 303. The tape 304 is extended outwardly of and on the front side or edge of the cassette body 301 by way of tape extraction openings 305, 306, formed at both front corners of the cassette body 301, so that the tape is placed from the tape reel 302 towards the other tape reel 303.

The reels 302, 303 are formed with reel shaft engaging openings 302a, 303a, into which are inserted a pair of reel shafts that are provided on the digital audio tape recorder for rotating the tape reels 302, 303. These engaging openings 302a, 303a are exposed to the outside by way of a pair reel shaft insertion openings 309, 310 formed in the bottom surface or wall of the cassette half 301b.

On the front side or edge of the cassette body 301, a lid 307 is mounted rotatably on a shaft or pin 308 to protect the tape 304 extended on the front surface of the cassette body 301 during the time the tape cassette 300 is not in use. This lid is rotationally biased in a lid closing direction for enclosing the tape 304 extended on the front side of the cassette body 301 by a spring, such as a torsion coil spring, placed about the shaft 308.

On the bottom surface of the cassette half 301b, a bottom cover 311 having a U-shaped cross section is slidably mounted for movement in the fore and aft direction, for closing the reel shaft insertion openings 309, 310 during non-use of the tape cassette 300 to prevent intrusion of dust and dirt into the cassette body 301. The bottom cover 311 is formed with a pair of insertion openings 312, 313, which, when the bottom cover 311 is moved towards the rear side or edge of the cassette body 301, are in register with the reel shaft insertion openings 309, 310 to permit the reel shafts on the digital audio tape recorder to extend into the interior of the main body 301. When the bottom cover 311 is moved towards the front edge or side of the cassette body 301, the insertion openings 312, 313 are offset relative to the reel shaft insertion openings 309, 310, and the bottom cover 311 extends over or covers a tape extracting section 314 provided on the front edge of the main body 301. The tape extracting section 314 has a cutout on the bottom front side of the main body 301 so that a tape guide member of the digital audio tape recorder may be inserted on the inner side of the tape 304 extended on the front side of the main body 301. This bottom cover 311 is biased by a spring, such as a torsion spring, in the direction for closing the reel shaft insertion openings 309, 310 and the tape extracting section 314.

The bottom cover 311 is engaged with a pair of outwardly biased locking pawls 315, 316, provided on the main body 301, and is formed with rear engaging openings 317, 318 and front engaging openings 319, 320 for locking the bottom cover 311 at the forward and rear positions, respectively. With the locking pawls 315, 316 engaged in the rear engaging openings 317, 318, the bottom cover 311 is locked at the position of closing the reel shaft insertion openings 309, 310 and the tape extracting section 314 and, with the locking pawls 315, 316 engaged with the front engaging openings 319, 320, the bottom cover 311 is locked at the position that opens the reel shaft insertion openings 309, 310 and the tape extracting section 314.

The rear engaging openings 317, 318 and the forward engaging openings 319, 320 are formed in a pair of recessed grooves 321, 322 provided on the bottom surface of the bottom cover 311 to extend in the fore and aft direction of the cassette body 301. Disengaging means, in the form of projections, which are formed on an upper surface of a bottom plate of a cassette transfer frame, not shown, of the digital audio tape recorder, are introduced into the recessed grooves 321, 322 for unlocking the locking pawls 315, 316 from the engaging openings 317, 318, 319, 320. That is, when the disengaging means in the form of projections are introduced into the recessed grooves 321, 322, the locking pawls 315, 316 are thrusted or urged towards the interior of the cassette body 301, so that the locking pawls 315, 316 are unlocked from the rear engaging openings 317, 318 or the forward engaging openings 319, 320 to unlock the bottom cover 311 from the cassette body 301.

The cassette body 301 is provided with positioning openings 323 for positioning the tape cassette 300 in the digital audio tape recorder when the tape cassette 300 is positioned within the tape recorder.

Meanwhile, in a digital audio tape recorder employing the above described tape cassette 300 as the recording medium, a cassette loading mechanism has been proposed, which is constructed to introduce the tape cassette 300 from the front side of the main body of the tape recorder, and which is known mainly as the front loading system. In the digital audio tape recorder provided with a cassette loading mechanism operating under a front loading system, the tape cassette 300 is introduced into a tape recorder housing 324, as shown in FIG. 3, via a cassette inserting opening 325 formed on the forward side of the tape recorder housing 324, with the lid 307 first, so as to be supported by a cassette holder or a cassette transfer frame, not shown, provided in the tape recorder housing 324. The tape cassette 300 is moved by the cassette holder or the cassette transfer frame in the horizontal direction, which is the direction normal to the rotary axes of the tape reels 302, 303, as shown by an arrow m in FIG. 3. During such movement in the horizontal direction, the unlocking means in the form of projections formed on the upper surface of the bottom plate of the cassette holder or the cassette transfer frame are introduced into the recessed grooves 321, 322 to disengage the locking pawls 315, 316 from the rear engaging openings 317, 318 of the bottom cover 311, and bottom cover actuating means, such as a projection, which are provided on the bottom plate of the cassette transfer frame or the cassette holder, then abutting on the forward edge of the bottom cover 311. When the tape cassette 300 is moved further in the direction shown by an arrow m in FIG. 3, the bottom cover 311 is moved in the opposite direction to the direction of movement of the main body 301 until the insertion openings 312, 313 in the bottom cover 311 are in register with the reel shaft insertion openings 309, 310, and the reel shaft engaging openings 302a, 303a facing to the outside of the main body of the cassette 301. The tape cassette is then shifted in the vertical direction, which is the direction of the rotary axes of the tape reels 302, 303 until the reel shafts 326 are inserted and engaged with the reel shaft engaging openings 302a, 303a. During such vertical movement, the lid 307 is engaged by lid actuating means, not shown, and thereby opened. Also, with such vertical movement, a tape guide, not shown, of the tape loading mechanism is introduced into the tape extracting section 314.

The tape guide is adapted to be moved horizontally within the casing 324, and is moved in the direction of the arrow m in FIG. 3 more forwardly than the tape extracting section 314 to extract the tape 304. When the tape guide is moved as far as a predetermined position, the tape 304 is guided along a predetermined tape running path so as to be taken up on a magnetic head drum 327 of the recording and/or reproducing head apparatus provided within the housing 324.

With the digital audio tape recorder having the above described front cassette loading system, the amount of the shift or displacement $l_1$ in the direction of the thickness of the cassette body 301, or in the direction shown by the arrow n in FIG. 3, by which the tape cassette 300, which is introduced via the cassette insertion opening 325 and is moved by the cassette loading mechanism, is selected to be larger than the thickness t of the cassette body 301.

The purpose of such arrangement is to prevent the main body 301 from contacting with a pair of reel shafts 326 or the tape guide, not shown, provided in the digital audio tape recorder housing, when the tape cassette is shifted in the horizontal direction as indicated by the arrow n in FIG. 3.

Hence, the inner dimension of the housing along its height, that is, the distance $l_2$ between the cassette inserting openings 325 to the cassette attachment surface, need be at least twice the thickness t of the main body 301 and this thickness or distance $l_2$ creates difficulties in reducing the thickness of the overall apparatus.

There is also a risk that, with the tape cassette disposed in the recording or reproducing position in the housing, another tape cassette can be introduced by mistake from the cassette inserting opening 325.

Thus, there is a risk for the component parts of the digital audio tape recorder, such as the tape cassette or the loading mechanism, to be damaged or destroyed by such dual intrusion of the tape cassettes by mistake.

SUMMARY OF THE INVENTION

It is an object of the present invention to provide a recording and/or reproducing apparatus in which the axial displacement of the tape cassette transfer mechanism is selected to be lesser than the tape cassette thickness to reduce the thickness of the overall apparatus.

It is another object of the present invention to provide a recording and/or reproducing apparatus in which it is possible to prevent a tape cassette from being introduced via a cassette inserting opening after another tape cassette is already positioned within the recording and/or reproducing apparatus, that is, to prevent dual insertion of tape cassettes.

For accomplishing the above objects, the present invention provides a recording and/or reproducing apparatus for recording and/or reproducing information signals with the use of a tape cassette, which apparatus is provided with a pair of reel shafts each having an engaging member mounted with a bias towards the end of the shaft, and a tape cassette transfer mechanism adapted for shifting the tape cassette inserted by way of the cassette inserting opening in a first direction normal to the reel shafts and guiding or loading the tape cassette in a second direction extending parallel to the reel shafts for inserting and engaging the reel shafts with a pair of tape reels within the tape cassette, wherein, according to the present invention, when at least the tape cassette transfer mechanism is set at a position facing the cassette inserting openings, the tape cassette is thrusted by the tape cassette transfer mechanism towards the proximal side of a reel shaft for positioning, against the force of a biasing member biasing an engaging member provided to each of a pair of reel shafts, whereby to reduce the displacement in the second direction of the tape reel of the tape cassette by the tape cassette transfer mechanism to a value less than the thickness of the tape cassette and to reduce the thickness of the apparatus to less than twice the thickness of the tape cassette, and wherein, according to the present invention, after completion of the tape cassette loading by the tape cassette transfer mechanism, the tape cassette is partially exposed to the cassette inserting opening to prevent another tape cassette from being introduced into the cassette inserting opening after completion of loading of the first mentioned tape cassette.

The above and other objects and advantages of the present invention will become more apparent from the claims and the following description of the preferred embodiment thereof, especially when read in conjunction with the accompanying drawings.

BRIEF DESCRIPTION OF THE DRAWINGS

FIGS. 19A to 19D are explanatory views showing the gearing of the cassette loading mechanism and the tape loading mechanism, wherein FIG. 19A shows the starting state of tape cassette loading; FIG. 19B shows the completed state of tape cassette loading and starting state of the magnetic tape loading on a tape running path; FIG. 19C shows the completed state of tape loading on a predetermined tape running path, and FIG. 19D is a cross sectional view taken along line XIXD—XIXD of FIG. 19A;

DESCRIPTION OF THE PREFERRED EMBODIMENTS

Figure 1:
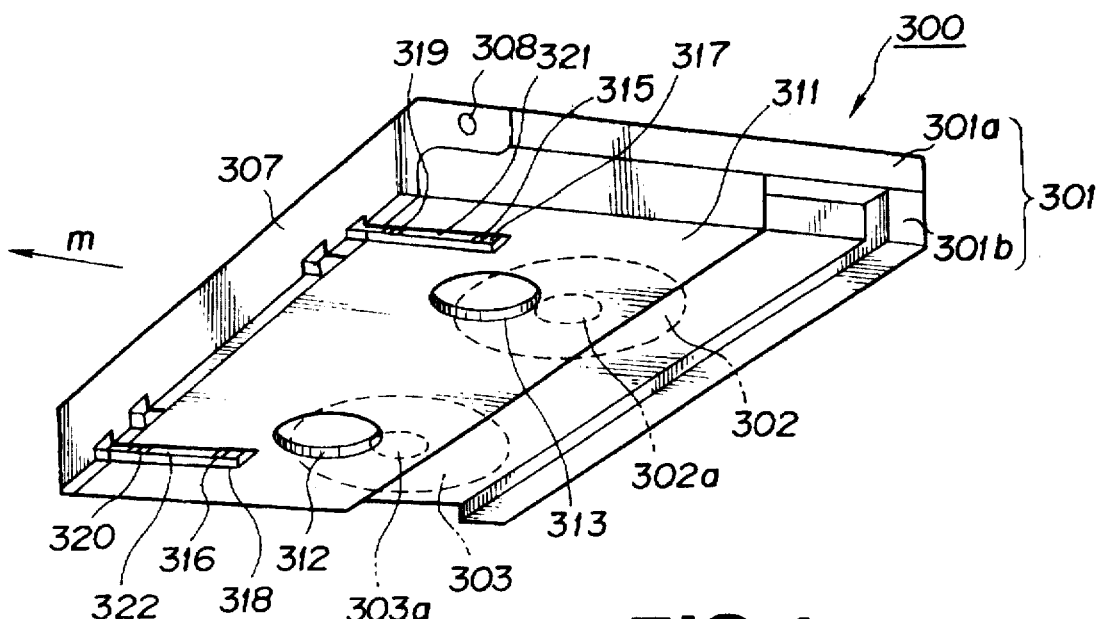
FIG. 1 is a perspective view of a tape cassette employed in the recording and/or reproducing apparatus according to the present invention and in a conventional recording and/or reproducing apparatus.

By referring to the drawings, preferred illustrative embodiments of the present invention will be explained in detail.

Figure 2:
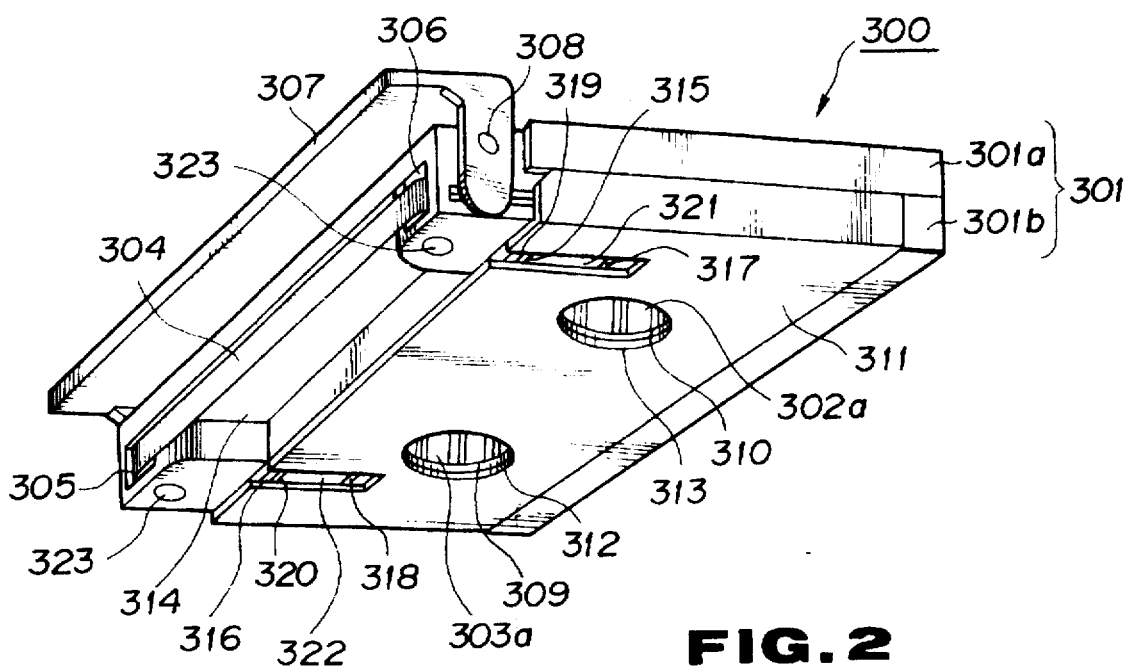
FIG. 2 is a perspective view of an actuated state of the lid and the bottom cover of the tape cassette shown in FIG. 1.
Figure 3:
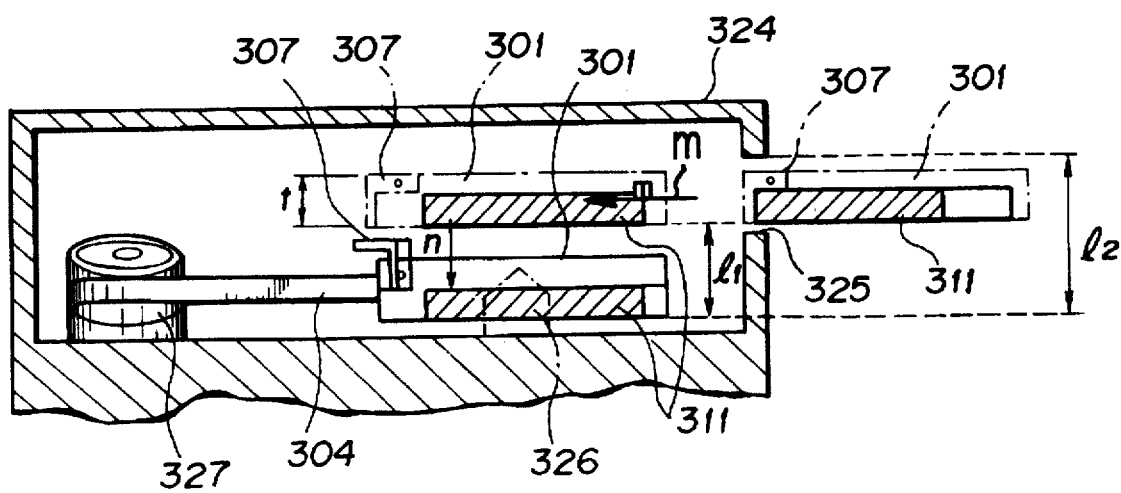
FIG. 3 is a diagrammatic side elevation of the tape cassette positioning operation in the conventional recording and/or reproducing apparatus.

In the present embodiments, the present invention is applied to a digital audio tape recorder (DAT) for recording and/or reproducing data signals, such as musical sound signals, using the aforementioned tape cassette shown in FIGS. 1 and 2.

This digital audio tape recorder has a cassette loading mechanism operating as a tape cassette transfer mechanism for transporting and positioning the tape cassette introduced by way of a cassette insertion opening formed in a casing or housing of the main body of the tape recorder and a tape loading mechanism for extracting a tape out of the positioned tape cassette and guiding the tape on a predetermined tape running route.

The cassette loading mechanism and the tape loading mechanism will be explained.

The cassette loading mechanism will be first explained.

Figure 4:
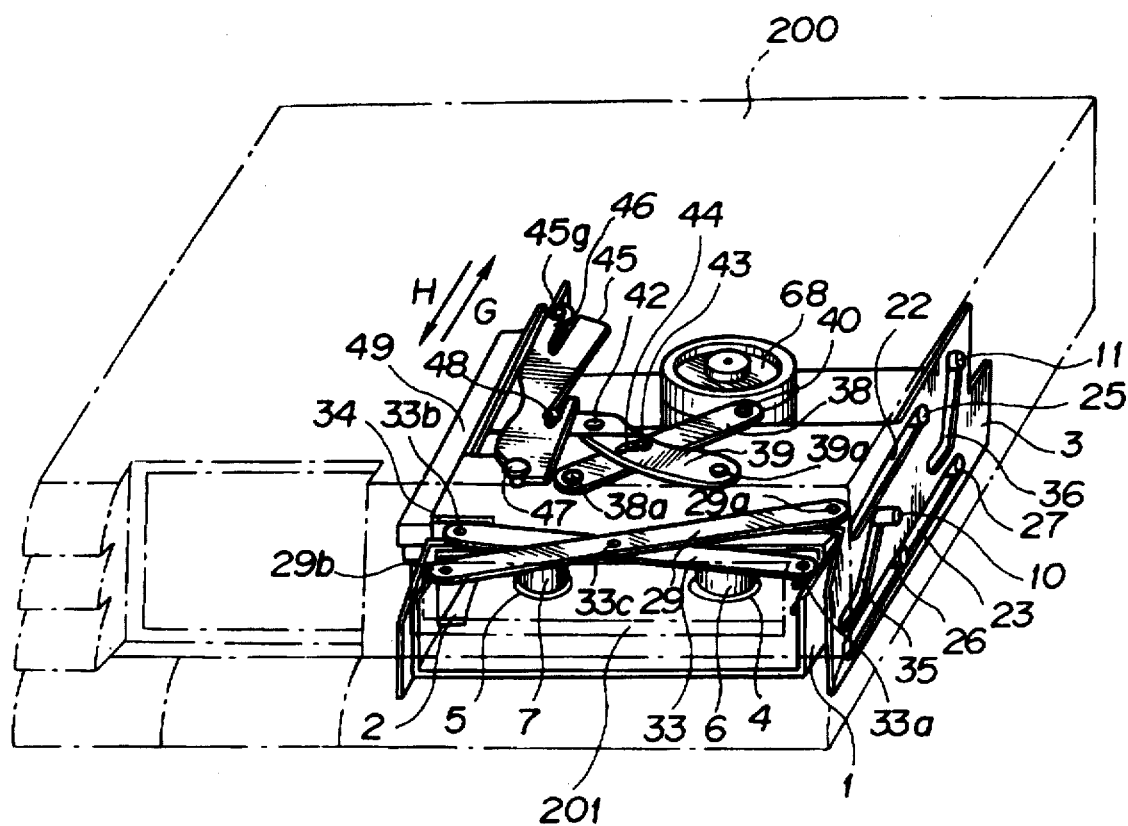
FIG. 4 is a perspective view of the cassette loading mechanism and the tape loading mechanism according to the present invention, which mechanism constitutes essential portions of a digital audio tape recorder which is the recording and/or reproducing apparatus.
Figure 5:
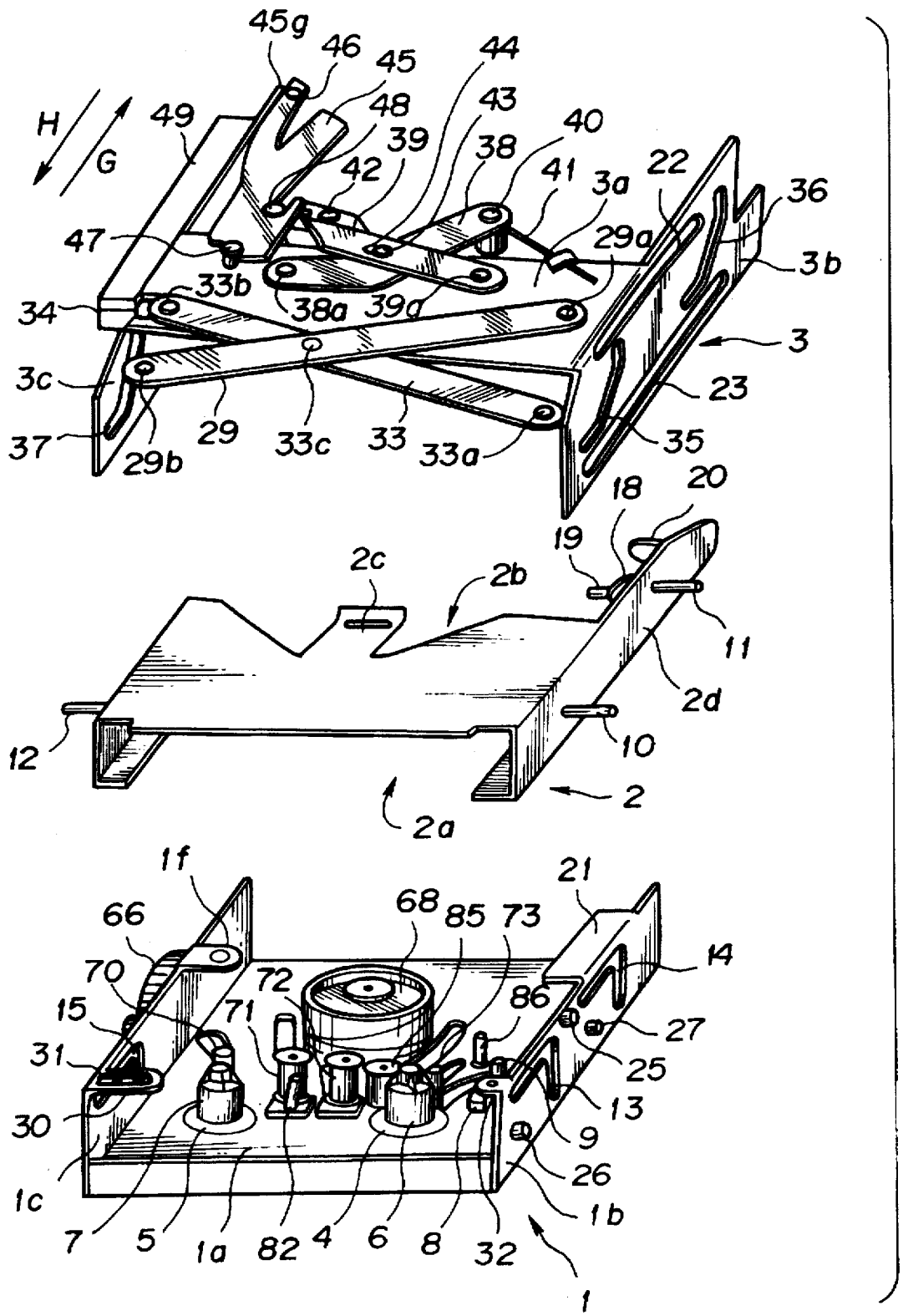
FIG. 5 is an exploded perspective view showing the construction of the cassette loading mechanism and the tape loading mechanism.
Figure 6:
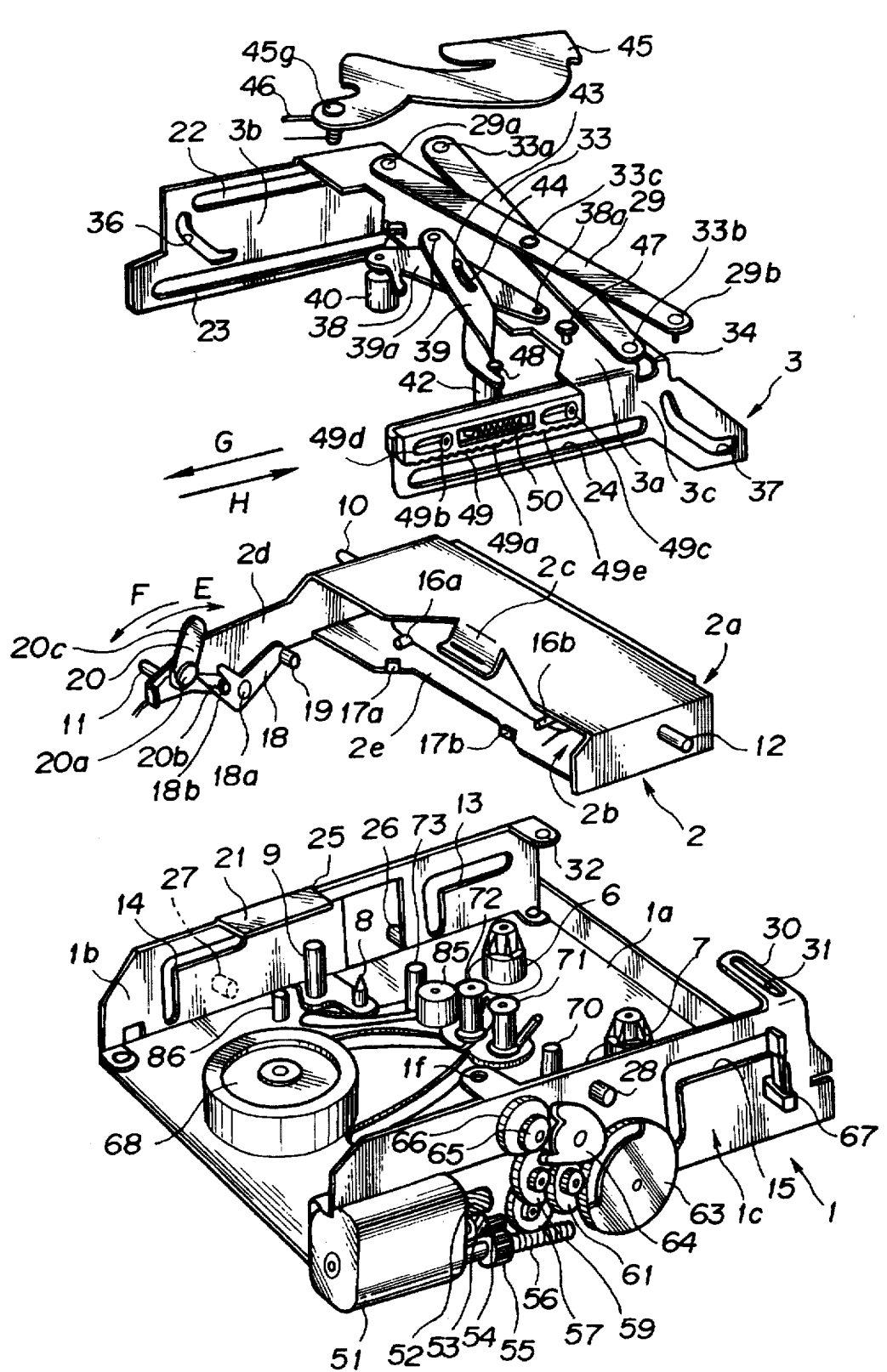
FIG. 6 is an exploded perspective view similar to FIG. 5 but looking from a different direction.

As shown in FIGS. 4, 5 and 6, this cassette loading mechanism is provided with a chassis 1, a cassette holder 2 and a cassette loading control frame 3.

As may be seen from FIG. 5, the chassis 1 is formed with a bottom plate section 1a, and a pair of side wall sections 1b, 1c formed such as by bending up the upper surface of the side edges of the bottom plate section 1a, and is secured in position within a housing 200 of the tape recorder. A pair of apertures 4, 5 for passage therethrough of a pair of reel shafts 6, 7 are formed in the bottom plate section 1a. The reel shafts 6, 7, which are driven or rotated by a reel base driving device, not shown, are passed through these apertures 4, 5 from the bottom surface in the direction of the upper surface of the bottom surface section 1a.

Figure 7:
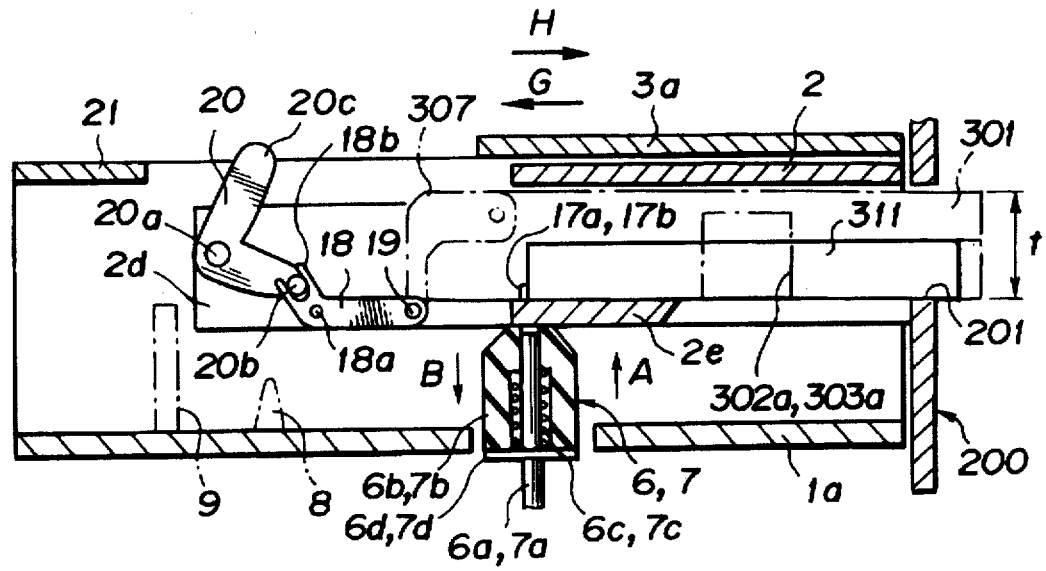
FIG. 7 is a cross sectional view showing a reel shaft mounted in a tape cassette positioning section of the digital audio tape recorder, and showing an initial tape cassette loading state.
Figure 8:
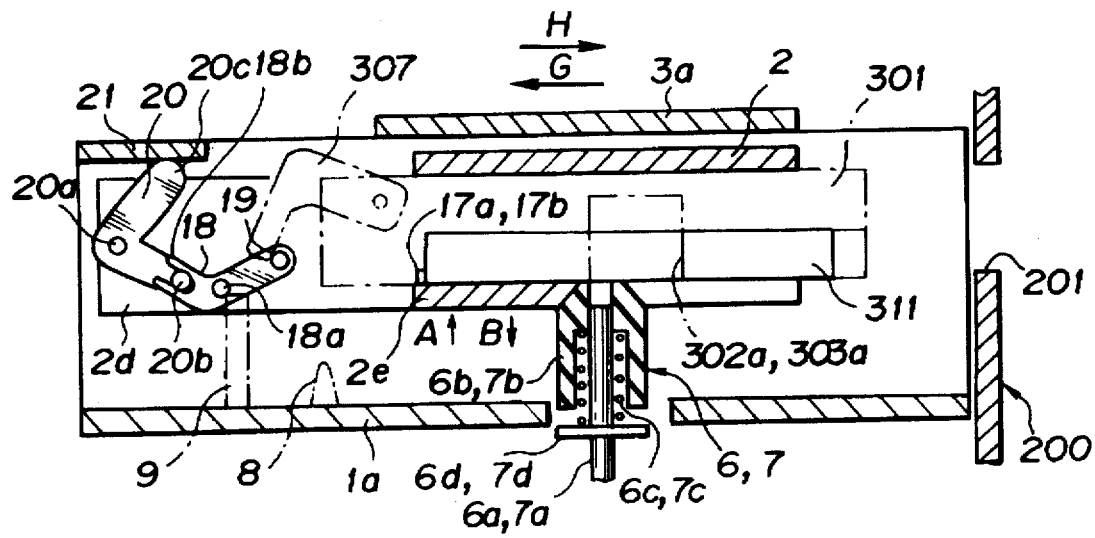
FIG. 8 is a cross sectional view showing an intermediate state of loading the cassette.

As shown in FIGS. 7 and 8, these reel shafts 7, 8 are formed by a pair of reel shaft supporting shanks 6a, 7a, driven by the reel base driving device, and a pair of engaging members 6b, 7b carried by end parts of the shanks 6a, 7a. these engaging members intrude into reel shaft engaging recesses 302a, 303a of the tape cassette so as to be engaged with tape reels 302, 303, respectively. These engaging members 6b, 7b are formed as cylinders surrounding the ends of the reel shaft supporting shanks 6a, 7a and are mounted to the shanks 6a, 7a so as to be movable vertically along an axial direction of the reel shafts 6, 7. The outer peripheral surfaces of the engaging members 6b, 7b are formed with plural equiangular engaging tongues engaging with plural engaging projections formed within the recesses 302a, 302b. The engaging members 6b, 7b are permanently biased into projecting in the direction of the foremost part side, as indicated by the arrow A in FIG. 7, by bias springs 6c, 7c provided between the engaging members 6b, 7b and a pair of engaging member stoppers 6d, 7d provided halfway on the shanks 6a, 7a.

On the upper surface of the bottom plate section 1a of the chassis 1 are formed a cassette positioning pin 8 (FIG. 6) for intruding into and engaging with a positioning hole 323 in a tape cassette 300 when the reel shafts 6, 7 are introduced into and engaged with the reel shaft engaging apertures 302a, 303a to secure the tape cassette 300. A lid opening pin 9 for abutting on the edge of a lid 307 of the tape cassette 300 to support the lid 307 in the opened position is also provided on the plate 1a.

On the upper surface side of the bottom plate section 1a are also provided plural tape guides of the tape loading mechanism as will be subsequently described, a magnetic head drum 68 of the recording/reproducing head apparatus and so forth in the predetermined positions.

A cassette holder 2 is formed as a frame so that the tape cassette may be introduced therein with the lid 307 directing towards the front side. The cassette holder 2 has openings 2a, 2b at the forward and rearward sides of the frame.

The forward side opening 2a of the cassette holder 2 faces a cassette inserting opening 201 (FIGS. 4 and 7) formed in the housing 200 during insertion and removal of the tape cassette 300 into and out of the cassette holder 2. At this time, a bottom plate section 2e of the frame of the cassette holder 2, which is positioned towards the bottom plate section 1a of the chassis 1, engages the ends of the engaging members 6b, 7b of the reel shafts 6, 7 to move and hold the engaging members 6b, 7b of the reel shafts 6, 7 along the direction shown by an arrow B in FIG. 7 against the bias of the engaging member biasing springs 6c, 7c.

First and second engaging pins 10, 11 (FIG. 5) are projectingly mounted on one lateral side of the cassette holder 2, while a third engaging pin 12 is projectingly mounted on the other lateral side thereof, with the first and second engaging pins 10, 11 intruding into and engaging with first and second engaging openings 13, 14 in the lateral wall section 1b of the chassis 1 and the third engaging pin 12 intruding into and engaging with a third engaging opening 15 in the lateral wall section 1c of the chassis 1 to support the cassette holder 2 between the side wall sections 1b and 1c.

Figure 13:
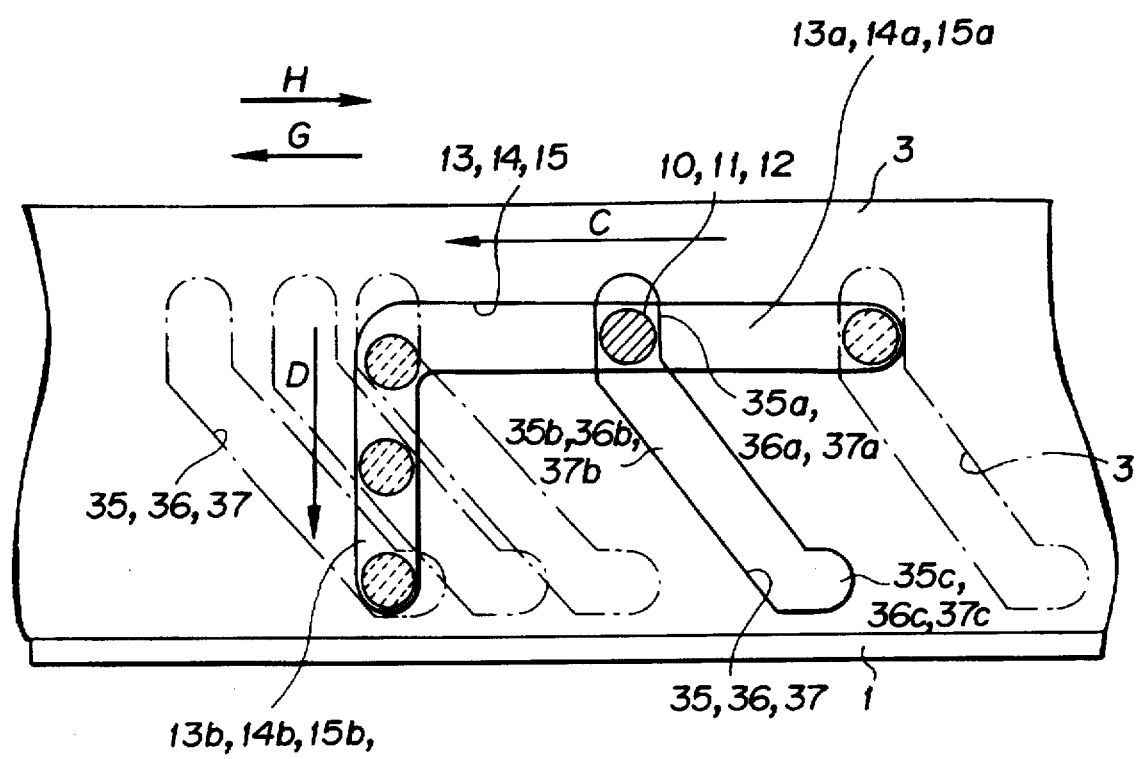
FIG. 13 is a diagrammatic side elevational view showing the movement of the cassette holder of the digital audio tape recorder.

Referring to FIG. 13, the first and second engaging openings 13, 14 engaged with the first and second engaging pins 10, 11, respectively, and the third engaging opening 15 engaged with the third engaging pin 12, are each formed in the shape of a letter L with first portions 13a, 14a, 15a extending parallel to the bottom plate section 1a and second portions 13b, 14b, 15b contiguous to these first portions 13a to 15a and extending normal to the bottom plate section 1a. When the engaging pins 10, 11, 12 are moved along the engaging openings 13, 14, 15, respectively, the cassette holder 2 is moved, from the position in which the forward opening 2a faces the cassette inserting opening 201, rearwardly in a first direction parallel to the bottom plate section 1a so that the opening 2a is moved away from the cassette inserting opening 201, as shown by an arrow C in FIG. 13. Then, the holder 2 is moved in a second direction normal to the bottom plate section 1a so that it approaches the bottom plate section 1a, as shown by an arrow D in FIG. 13.

A pair of bosses 16a and 16b (FIG. 6) on the bottom plate section 2e of the cassette holder 2 are formed and are introduced into recesses 321, 322 to thrust lock pawls 315, 316 to disengage the pawls 315, 316 from a bottom cover 311. A pair of cover opening pawls 17a, 17b are provided on section 2e to abut on the forward edges of the bottom cover 311 to shift the bottom cover 311 in the opposite direction relative to the cassette body 301, when the tape cassette 300 is inserted into the cassette holder 2.

On the upper edge of the rearward opening 2b of the cassette holder 2 is formed a cassette presser 2c which is inclined slightly towards the inner side of the rearward opening 2b. This cassette presser 2c is resilient and functions to thrust and support the tape cassette introduced into the cassette holder 2.

On one lateral side of the cassette holder 2 is formed an extension 2d which is extended rearwardly along the shifting direction of the cassette holder 2. On the inner side or surface of the extension 2d, a first lid operating lever 18 is pivotally mounted via a supporting shaft 18a. A lid operating pin 19 is mounted upright or perpendicular on one end of the first lid operating lever 18 and is brought into abutment with the edge of the lid 307 of the tape cassette inserted as far as a predetermined position into the cassette holder from the front side.

This first lid operating lever 18 has its other end 18b rotatably engaged with one end 20b of a second lid operating lever 20. The arrangement is so made that, by rotating the second lid operating lever 20 in the direction shown by an arrow E in FIG. 6, the first lid operating lever 18 is rotated to cause the lid 307 to be rotated by the lid operating pin 19. The second lid operating lever 20 is rotationally biased by a spring member, not shown, in a direction shown by an arrow F in FIG. 6 for displacing the lid operating pin 19 away from the edge of the lid 307.

Figure 11:
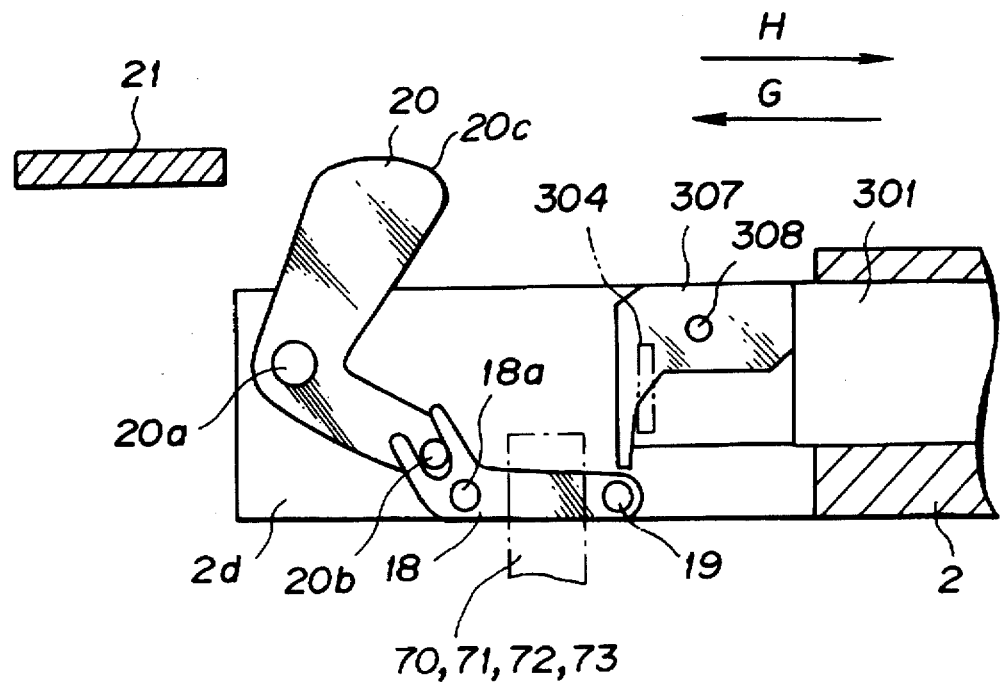
FIG. 11 is a diagrammatic side elevational view showing the construction of a lid actuating lever of the digital audio tape recorder.
Figure 12:
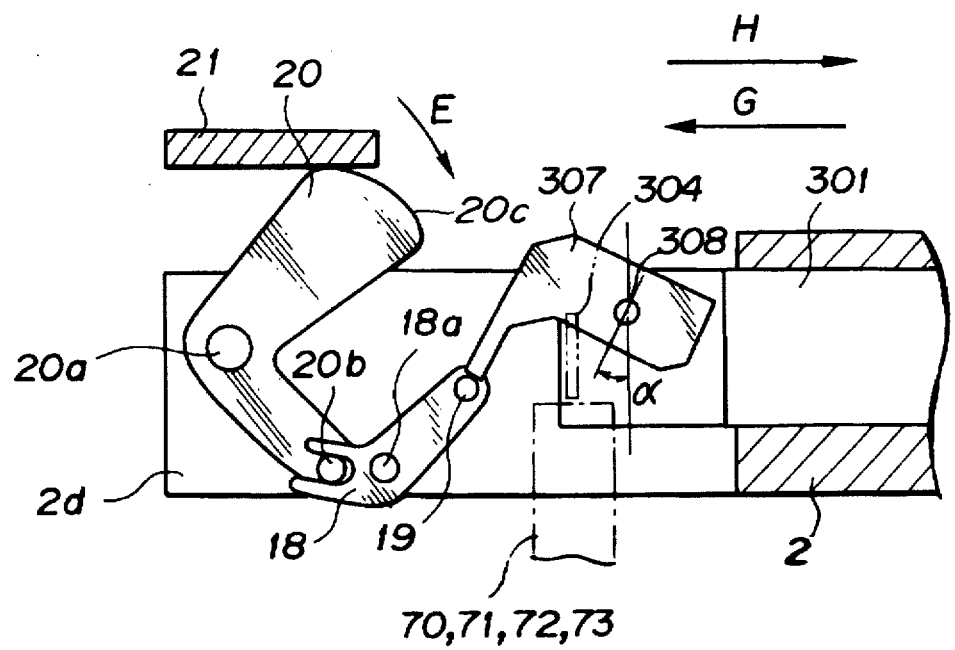
FIG. 12 is a diagrammatic side elevational view showing the state of the lid actuating lever during cassette loading.

The second lid operating lever 20 has its other end 20c projecting upwardly from the extension 2d. During movement of the cassette holder 2 parallel to the bottom plate 1a, the end 20c of the second lid operating lever 20 abuts on a lid operating member 21, mounted to the lateral side of the side wall section 1b, as shown in FIGS. 11 and 12, so as to be rotated in the direction of an arrow E.

Referring to FIG. 6, the cassette loading control frame 3 is formed with a ceiling or upper plate section 3a and a pair of lateral plate sections 3b, 3c mounted on both sides of the ceiling plate section 3a. This cassette loading control frame 3 has its ceiling plate section 3a running parallel to the bottom plate section 1a of the chassis 1 and the lateral plate sections 3b, 3c disposed on the outer sides of the lateral wall sections 1b, 1c.

The lateral plate section 3b is formed with first and second slide guide grooves 22, 23, while the other lateral plate section 3c is formed with a third slide guide groove 24. A first guide pin 25 mounted to extend upright on the outer surface of the lateral wall section 1b is inserted into and engaged with the first slide guide groove 22, while second and third guide pins 26, 27, mounted to extend upright on the outer surface of the lateral wall section 1b, are inserted into and engaged with the second slide guide groove 23. A fourth guide pin 28, mounted to extend upright on the outer surface of the lateral wall section 1c, is inserted into and engaged with the third slide guide groove 24.

With the guide pins 25, 26, 27, 28 inserted into and engaged with the slide guide grooves 22, 23, 24, so as to be supported thereby, the cassette loading control frame 3 is supported for movement in a direction extending parallel to the bottom plate 1a and the lateral wall sections 1b, 1c, relative to the chassis 1, as shown by arrows G, H in FIGS. 5 and 6.

On the upper surface of the ceiling plate 3a are provided a pair of opening/closing supporting arms 29, 33 interconnecting the chassis 1 and the cassette loading control frame 3. That is, towards one side on the upper surface of the ceiling plate section 3a is rotatably mounted one end 29a of the first supporting arm 29. The first supporting arm 29 has its other end 29b engaging in an elongate opening 31 formed in a first arm supporting member 30 mounted to the forward edge of the lateral wall section 1c of the chassis 1. A second arm supporting member 32 is mounted at the forward side of the lateral wall section 1b of the chassis 1 and the second supporting arm 33 has its one end 33a rotatably mounted to the second arm supporting member 32. The second supporting arm 33 has its other end 33b engaging in a second elongate opening 34 formed at the other lateral side of the ceiling plate section 3a. These first and second supporting arms 29, 33 intersect each other in the form of a letter X and are pivotally connected to each other at an intermediate point 33c for rotation about the point 33c as the center of rotation or fulcrum point to prevent the cassette loading control frame 3 from being tilted relative to the chassis 1 while assuring smooth shifting of the cassette loading control frame 3 relative to the chassis 1.

The lateral plate section 3b (FIG. 5) is formed with first and second control cam grooves 35, 36, while the other lateral plate section 3c is formed with a third control cam groove 37. In these first to third control cam grooves 35 to 37 are inserted and engaged the outer or forward ends of the first to third engaging pins 10, 11, 12 of the cassette holder 2. Referring to FIG. 13, these first to third control cam grooves 35, 36, 37 are inclined in contour so as to approach the ceiling plate section 3a in proceeding from the forward side towards the rear side, and are provided in association with the first to third engaging openings 13, 14, 15. These control cam grooves 35, 36, 37 are formed by vertically extending portions 35a, 36a, 37a adjacent the ceiling plate side 3a in association with the portions 13a to 15a of the engaging openings 13, 14, 15 running parallel to the bottom plate section 1a. The control cam grooves 35, 36, 37 are also formed by inclined portions 35b, 36b, 37b, contiguous to the vertically extending portions 35a, 36a, 37a and extending downward therefrom, and by horizontally extending portions 35c, 36c, 37c, contiguous to the lower sides or ends of these inclined portions 35b, 36b, 37b, in association with the vertically extending portions 13b, 14b, 15b of the engaging openings 13, 14, 15 extending normal to the bottom plate section 1a.

With movement of the cassette loading control frame 3 in a direction parallel to the bottom plate section 1a and the lateral wall sections 1b, 1c, the engaging pins 10, 11, 12 are shifted so that the pins 10 to 12 are positioned in the overlapping region of the engaging openings 13, 14, 15 with the control cam grooves 35, 36, 37 associated therewith. Thus, when the cassette loading control frame 3 is shifted from the front towards the rear side, that is, along the direction shown by an arrow G in FIG. 13, the cassette holder 2 is shifted in a direction parallel to the bottom plate section 1a, that is, in a first direction shown by an arrow C in FIG. 13 in which the cassette holder 2 is moved away from the cassette inserting opening 201. Then, with the movement of the cassette loading control frame 3 in the direction shown by the arrow G in FIG. 13, the cassette holder 2 is moved in a direction normal to the bottom plate section 1a, as indicated by an arrow D in FIG. 13.

Figure 14:
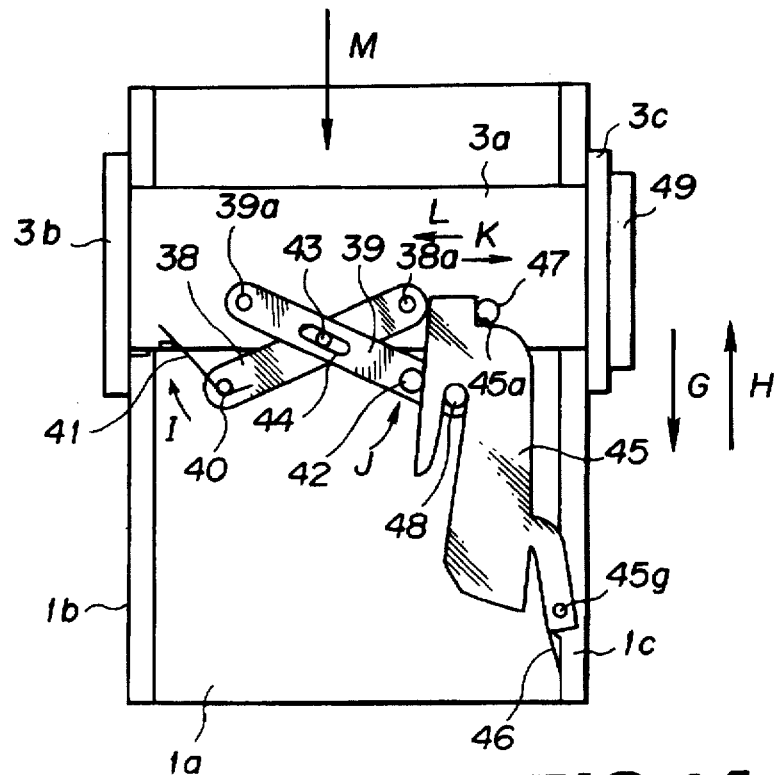
FIG. 14 is a top plan view showing the construction of the cassette loading mechanism.

A pair of interengaging cassette insertion detection arms 38, 39, as shown in FIG. 14, are on the upper surface of the ceiling plate 31. These cassette insertion detection arms 38, 39 intersect each other at the intermediate points, in the form of a letter X, and are connected to each other by a detecting arm engaging pin 43 on the detecting arm 38 engaging in a detecting arm engaging slot 44 in the detecting arm 39.

The first cassette insertion detecting arm is rotatably supported at its one end 38a on the upper surface of the ceiling plate section 3a, and carries a first cassette detecting pin 40 at the other end. This first cassette detecting pin 40 faces the one side of the rear opening 2b of the cassette holder 2, which one side is opposite to the inserting side of the tape cassette. The first cassette detecting lever 38 is rotationally biased by a first torsion coil spring 41 is a direction shown by an arrow I in FIG. 14, that is, in the direction along which the first cassette detecting pin 40 is moved towards the rearward opening 2b.

The second cassette insertion detecting arm 39 is rotatably supported at its one end 39a on the upper surface of the ceiling plate section 3a, and carries a second cassette detecting pin at its other end. This second cassette detecting pin 42 faces the other lateral side of the rearward opening 2b of the cassette holder 2.

The detecting arm engaging pin 43 is formed upright on the central portion of the first cassette insertion detecting arm 38 and is inserted into and engaged with the detecting arm engaging opening or slot 44 formed in the central portion of the second cassette insertion detecting arm 39. Hence, the second cassette insertion detecting arm 39 is also rotationally biased by the first torsion coil spring 41, similarly to the first cassette insertion detecting pin 40, along the direction shown by an arrow J in FIG. 14. Thus, the second cassette insertion detecting arm 39 is rotationally biased by means of the first cassette insertion detecting arm 38 in the direction along which the second cassette detecting pin 42 is shifted towards the rearward opening 2b.

These first and second cassette insertion detecting arms 38, 39 are rotated against the bias of the first torsion coil spring 41, when the tape cassette 300 is inserted into the cassette holder 2 via the cassette inserting opening 2a in the housing 200, by way of the forward opening 2a and the tape cassette 300 protrudes via the rearward opening 2b to thrust against the first and second cassette detecting pins 40, 42.

On the rear lateral edge of the lateral wall section 1c of the chassis 1 is mounted a cam plate supporting member 1f (FIG. 5), to which is attached a cam plate 45, which cam plate has its proximal end supported by a pin 45 for rotation on the cam plate supporting member 1f and is mounted to extend parallel to the bottom plate section 1a with the forward side directing towards the cassette loading control frame 3. This cam plate 45 is rotationally biased by a second torsion coil spring 46 in the direction shown by an arrow K in FIG. 14, that is, in a direction along which its proximal end is directed towards the outer side of the chassis 1.

Figure 15:
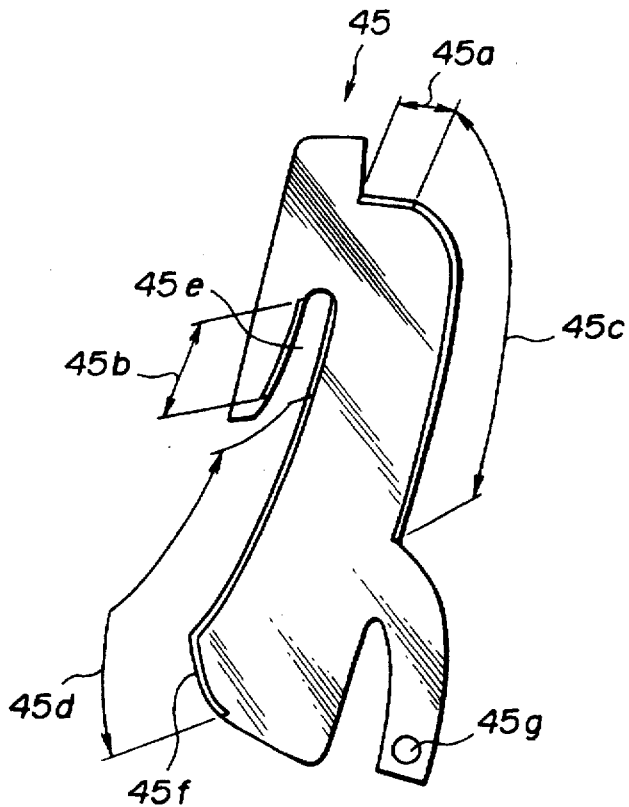
FIG. 15 is a top plan view showing a profile of a cam plate of the cassette loading mechanism.

In the state in which the tape cassette is not mounted to the tape recorder, as shown in FIG. 14, the distal side of the cam plate 45 faces the ceiling plate section 3a. A stop cam surface 45a is formed on the distal end, as shown in FIG. 15. Before insertion of the tape cassette, the stop cam surface 45a abuts on a stop pin 47 mounted upright on the ceiling plate section 3a to prevent the cassette loading control frame 3 from being shifted towards the rear, as indicated by the arrow G in FIGS. 5, 6 and 14.

Towards the foremost side of the cam plate 45 on the inner side of the chassis 1, a cam groove 45e, as shown in FIG. 15, is formed and is so contoured that it is closed towards the forward end of the cam plate 45 and opened towards its proximal end. The side of the cam groove 45e, on the inner side of the chassis 1, is formed with an unstop cam surface 45b permitting the cam plate 45 to be rotated by the rotation of the second cassette insertion detecting arm 39. That is, a cam pin 48 mounted upright on the proximal side of the second cassette insertion detecting arm 39 is engaged in the cam groove 45e. When the second cassette insertion detecting arm 39 is rotated, by insertion of the tape cassette 300, against the rotational bias, the cam pin 48 thrusts against the unstop cam surface 45b to rotate the cam plate 45 towards the inner side of the chassis 1, that is, in the direction shown by an arrow L in FIG. 14, against the bias of the second torsion coil spring 46. Such rotation of the cam plate 45 in the direction of arrow L in FIG. 14 releases the abutting engagement between the stop cam surface 45a and the stop pin 47, thus enabling the cassette loading control frame 3 to be moved in the direction shown by an arrow mark G in FIG. 14.

On the side of the cam plate 45 directed toward the outside of the chassis 1 is formed a cam plate actuating cam surface 45c so as to be contiguous to the stop cam surface 45a. The cam plate 45 is rotated on the pin 45g as the stop pin 47 moves along the cam plate actuating cam surface 45c with movement of the cassette loading control frame 3. This cam plate 45 causes the cam plate actuating cam surface 45c to abut on the stop pin 47 under the bias of the second torsion coil spring 46, so that, with movement of the cassette loading control frame 3 towards the rear in the direction of arrow G in FIGS. 5 and 6, the cam plate 45 is rotated to follow the profile of the cam plate actuating cam surface 45c.

On the side of the cam plate 45, directed toward the inner side of the chassis 1, there is formed a detecting arm actuating cam surface 45d so as to be contiguous to the opening side of the cam groove 45e. The cam surface 45d operates, as the cam plate 45 rotates with the movement of the cassette loading control frame 3, to rotate the second cassette insertion detecting arm 39 in the direction opposite to that shown by the arrow J in FIG. 14.

On the outer lateral surface of the other lateral plate 3c of the cassette loading control frame 3, there is mounted a rack gear 49 which, as shown in FIG. 6, is mounted parallel to the ceiling plate section 3a, with a gear section 49a direct towards the bottom plate section 1a. This rack gear 49 is supported on the lateral plate 3c by a pair of guide pins 49b, 49c and a pair of engaging openings 49d, 49e for movement over a predetermined shorter distance relative to the lateral plate 3c along the directions shown by the arrows G and H in FIG. 6, while being biased rearward by a tension coil spring 50 along the direction shown by an arrow G.

The cassette loading control frame 3 is moved by an electric drive motor 51 which is mounted on the outer side of the lateral wall section 1c of the chassis 1 and the driving power of which is transmitted to the rack gear 49 by way of a transmission gearing comprised of plural gears.

Figure 19A:
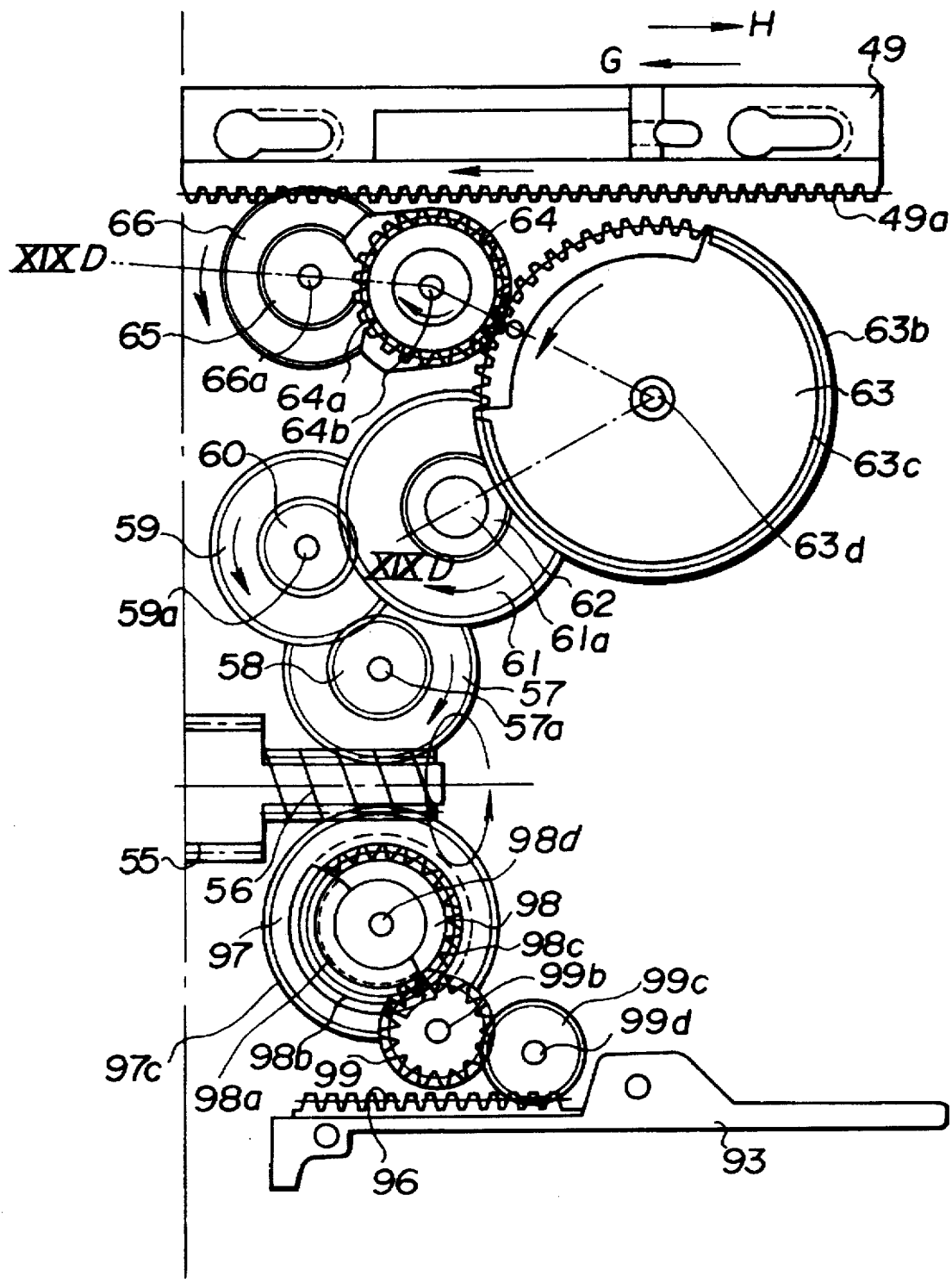

Referring to FIGS. 6, 19A, B and C, a drive gear 52 (FIG. 6), mounted on a drive shaft of the electric motor 51, meshes with a first transmission gear 53. On the first transmission gear 53, a second transmission gear 54 lesser in diameter than the first transmission gear 54 is mounted coaxially and integrally, and meshes with a third transmission gear 55. A transmission worm gear 56 is mounted coaxially and integrally on the third transmission gear 55 and meshes with a first worm wheel 57 (FIGS. 6 and 19A, 19B, 19C), which may be rotated about a rotary shaft 57a. On this first worm wheel 57, a fourth transmission gear 58 is mounted coaxially and integrally, and meshes with a fifth transmission gear 59 which is mounted for rotation on a rotary shaft 59a. On this fifth transmission gear 59, a sixth transmission gear 60 is mounted coaxially and integrally, and meshes with a seventh transmission gear 61 which is mounted for rotation about a rotary shaft 61a. On the seventh transmission gear 61, an eighth transmission gear 62 is mounted coaxially and integrally, and meshes with uninterrupted peripheral teeth 63c formed on a lower side of a first interrupted gear 63, which is mounted to rotate about a rotary shaft 63d, as shown in FIG. 19D. This first interrupted gear 63 meshes intermittently with a first flanged gear 64 which will rotate about a rotary shaft 64b. This first flanged gear 64 meshes with a ninth transmission gear 65 which rotates about a rotary shaft 66a. On the ninth transmission gear 65, a pinion gear 66 is mounted coaxially and integrally, and meshes with the rack gear 49 mounted on the cassette loading control frame 3.

Figure 20:
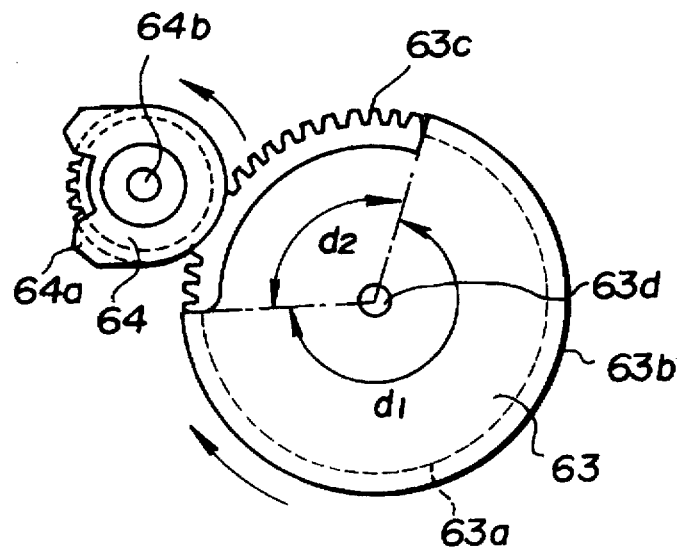
FIG. 20 is a plan view for illustrating the state of meshing of the flanged gear and the interrupted gear of the gearing of the cassette loading mechanism.
Figure 21:
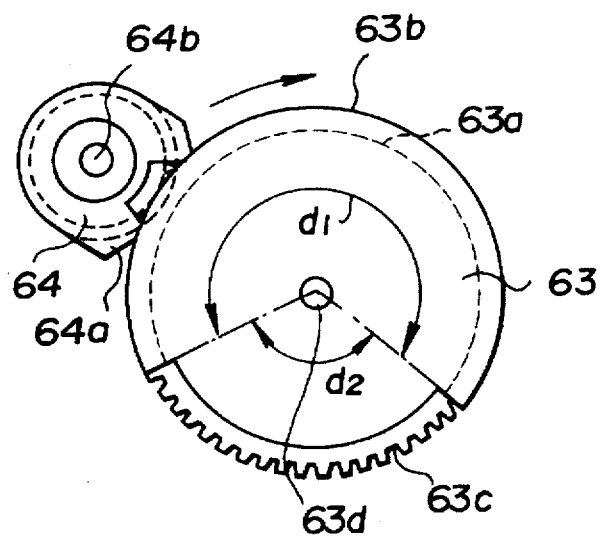
FIG. 21 is a plan view showing the state in which the flanged gear is supported in the halted state by the interrupted gear.

Referring to FIGS. 20 and 21, the first interrupted gear 63 is formed with uninterrupted peripheral teeth on the lower step thereof meshing with the eighth transmission gear 62, however, it is free of teeth over a predetermined angular extent or segment $d_1$ on an intermediate step to form a toothless segment 63a which is in line with a tooth section 63c of an angular extent or segment $d_2$. A flanged guide 63b is provided in association with the interrupted tooth or toothless section or segment 63a.

Referring to FIG. 21, the first flanged gear 64 is formed integrally with a flange section 64a, which is supported unrotatably in abutting engagement with the guide 63b when the gear 64 faces the toothless section 63a of the first interrupted gear 63.

Referring to FIG. 6, on the outer lateral surface of the lateral wall 1c of the chassis 1, at a position facing the third engaging opening 15, there is mounted a microswitch 67 for sensing the start and the end of cassette loading, so as to be actuated by the third engaging pin 12 of the cassette holder 2.

Figure 16:
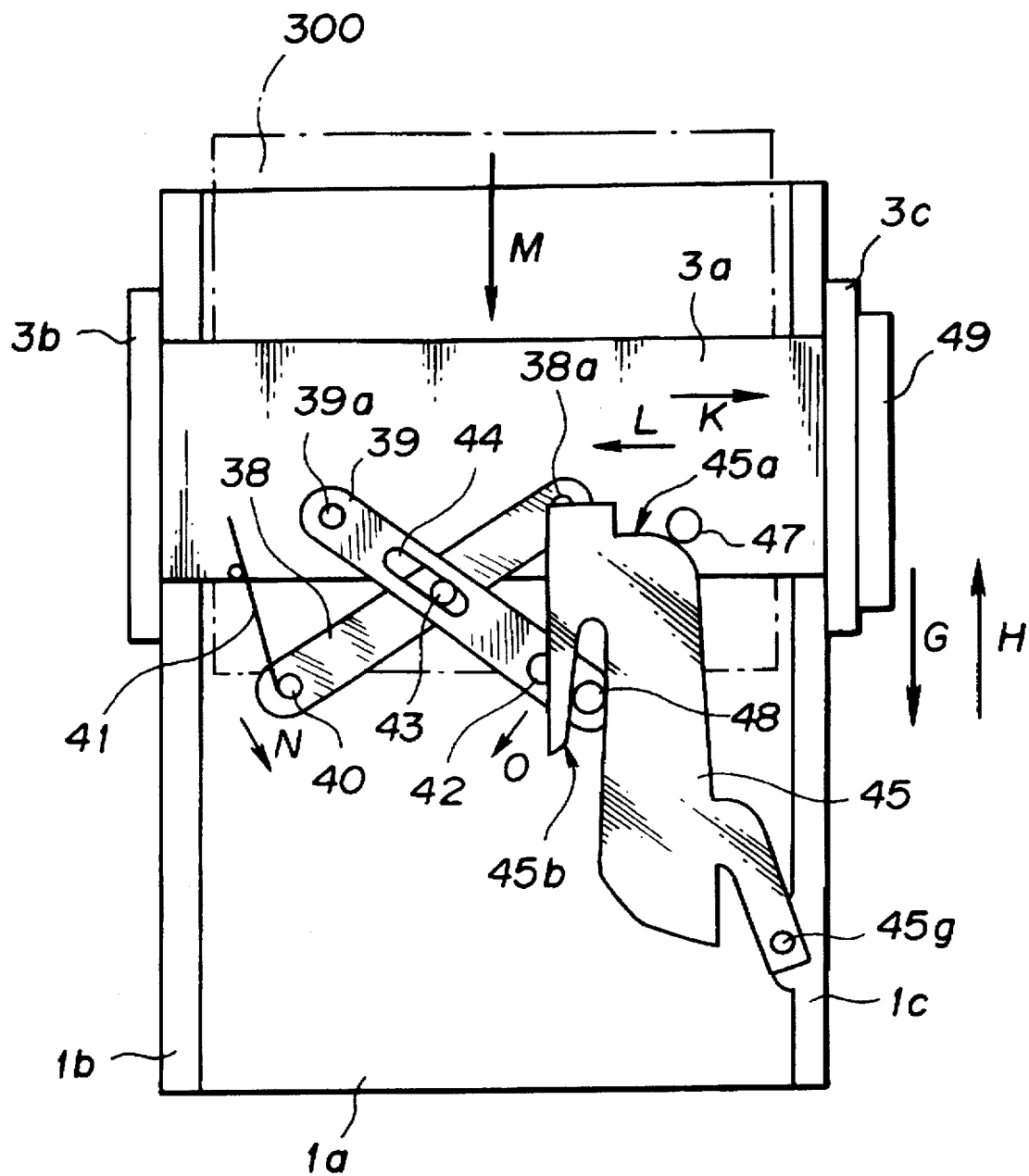
FIG. 16 is a top plan view showing a starting state of the cassette loading by the cassette loading mechanism.

In the above described cassette loading mechanism, when the tape cassette 300 is inserted in the direction shown by an arrow M through the cassette opening 201, as shown in FIG. 16, this tape cassette 300 is inserted by way of the forward opening 2a into the cassette holder 2 to rotate the first and second cassette insertion detecting arms 38, 39 along the directions shown by arrows N and O, respectively, against the bias of the first torsion coil spring 41.

The cam pin 48 is then thrust against the unstop cam surface 45b to rotate the cam plate 45 towards the inner side of the chassis 1, or in the direction shown by an arrow L in FIG. 16. The abutting engagement between the stop cam surface 45a and the stop pin 47 is now released to permit the cassette loading control frame 3 to be moved relative to the chassis 1 from the front towards the rear side, as shown by the arrow G in FIG. 16.

In this manner, in the above described cassette loading mechanism, when the tape cassette 300 is inserted to a predetermined position relative to the cassette holder 2, and the first and second cassette detecting arms 38, 39 are rotated a predetermined angle, the cassette loading control frame 3 becomes freely movable relative to the chassis 1.

When the tape cassette 300 is inserted, the projections 16a, 16b are introduced into the recesses 321, 322, as mentioned hereinabove, to disengage the bottom cover 311, and at the same time, the bottom cover 311 is moved relative to the cassette body 301 by the cover opening pawls 17a, 17b.

When the tape cassette 300 is inserted toward the rear side of the chassis 1, as indicated by the arrow M in FIG. 16, the cassette holder 2 is moved slightly rearwards, along with the cassette loading control frame 3, relative to the chassis 1. That is, since the rack gear 49 is movable over a predetermined extent relative to the cassette loading control frame 3, the frame 3 can be moved a predetermined distance with the rack gear 49 remaining stationary. With the cassette holder 2 being moved in this manner, the second engaging pin 12 is spaced apart from the microswitch 67 to actuate this microswitch 67.

With actuation of the microswitch 67, the electric motor 51 is driven in the forward direction, the rack gear 49 is fed to shift the cassette loading control frame 3. As shown in FIG. 20, the first flanged gear 64 meshes at this time with the tooth section 63c of the first interrupted gear 63.

With such a cassette loading mechanism, since the cassette loading control frame 3 is not movable unless the tape cassette is introduced as far as a predetermined position into the cassette holder 2, the microswitch 67 remains unactivated. For example, when the tape cassette 300 is inserted with a tilt, the cassette loading control frame is not shifted.

With the cassette loading frame 3 thus shifted, the cassette holder 2 is moved in the above-mentioned first direction parallel to the bottom plate section 1a. During such movement of the cassette holder, the bottom plate 2e of the cassette holder 2 urges the engaging members 6b, 7b of the reel shafts 6, 7 along the direction shown by an arrow B in FIG. 7, which is the direction towards the proximal side of the supporting shafts 6a, 7a against the force of the biasing springs 6c, 7c, as shown in FIG. 7, for thereby positioning the engaging members 6b, 7b at the lower position. When the cassette loading control frame 3 is moved further, the cassette holder 2 is moved in the above-mentioned first direction. During such movement of the cassette holder, the other end of the second lid actuating lever 20 abuts on the lid actuating member 21 to rotate it along the direction shown by the arrow E in FIG. 12 to rotate the lid 307 through an angular extent of 45° to 80°. When thus rotated, the lid 307 is moved to a position out of contact with plural tape guides making up the tape loading mechanism as later described. Subsequently, the movement of the cassette holder 2 in the first direction is terminated.

Figure 17:
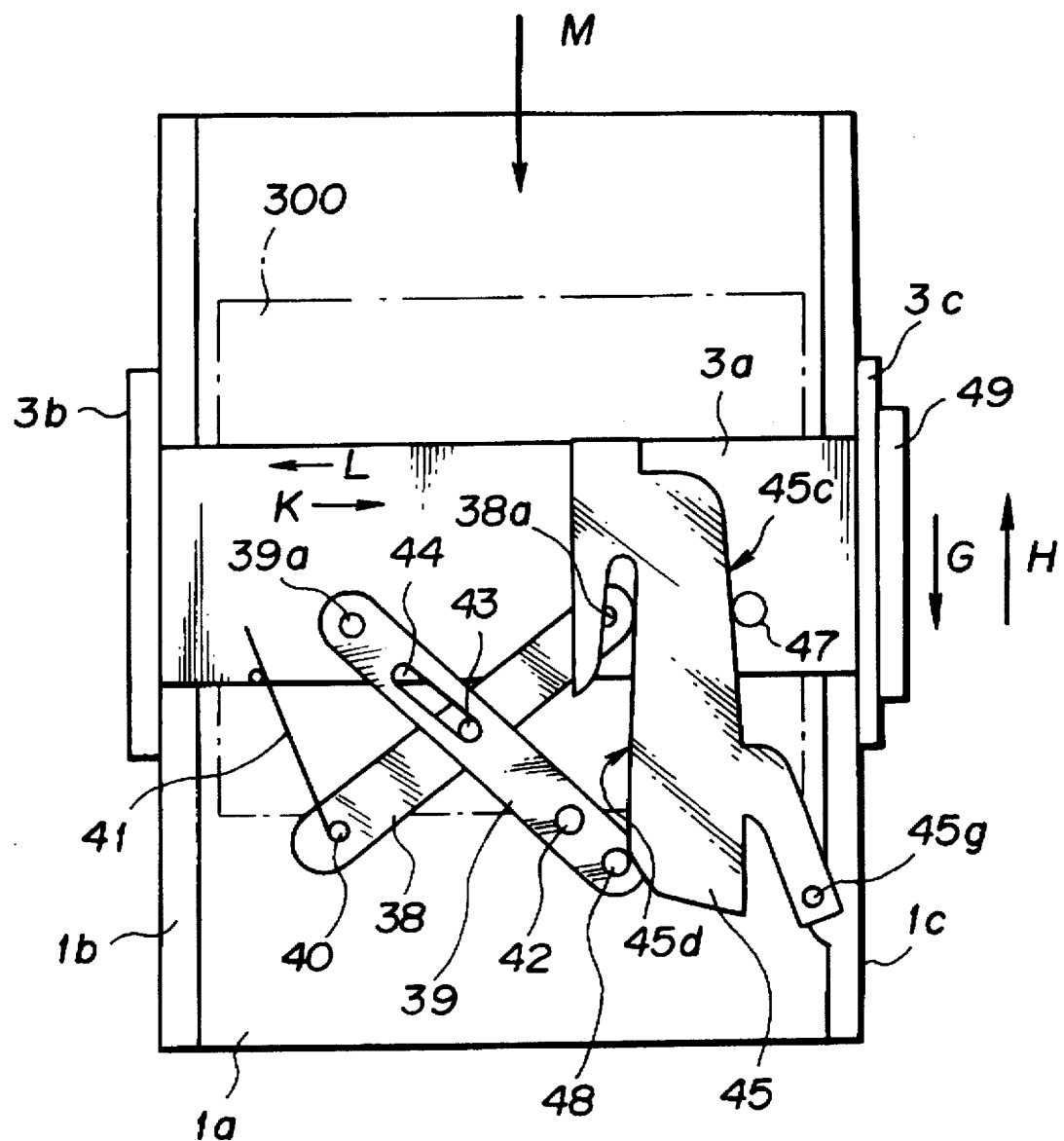
FIG. 17 is a top plan view showing an intermediate state of cassette loading by the cassette loading mechanism.

The cam plate 45 is rotated, as shown in FIG. 17, by the stop pin 47 being shifted in sliding contract with the cam plate actuating cam surface 45c. At this time, the cam pin 48 is moved in sliding contact with the detection arm actuating cam surface 45d to rotate the cassette insertion detecting arms 38, 39 to shift the cassette detecting pins 40, 42 away from the tape cassette.

In addition, with movement of the cassette loading control frame 3, the bottom plate 2e of the cassette holder 2 is moved to a position out of contact with the ends of the engaging members 6b, 7b of the reel shafts 6, 7, so that these engaging members 6b, 7b are moved, under the force of the biasing springs 6c, 7c, in the direction shown by the arrow A in FIG. 8, that is upward by a predetermined amount equal to or more than the thickness of the bottom plate 2e of the cassette holder 2.

Figure 9:
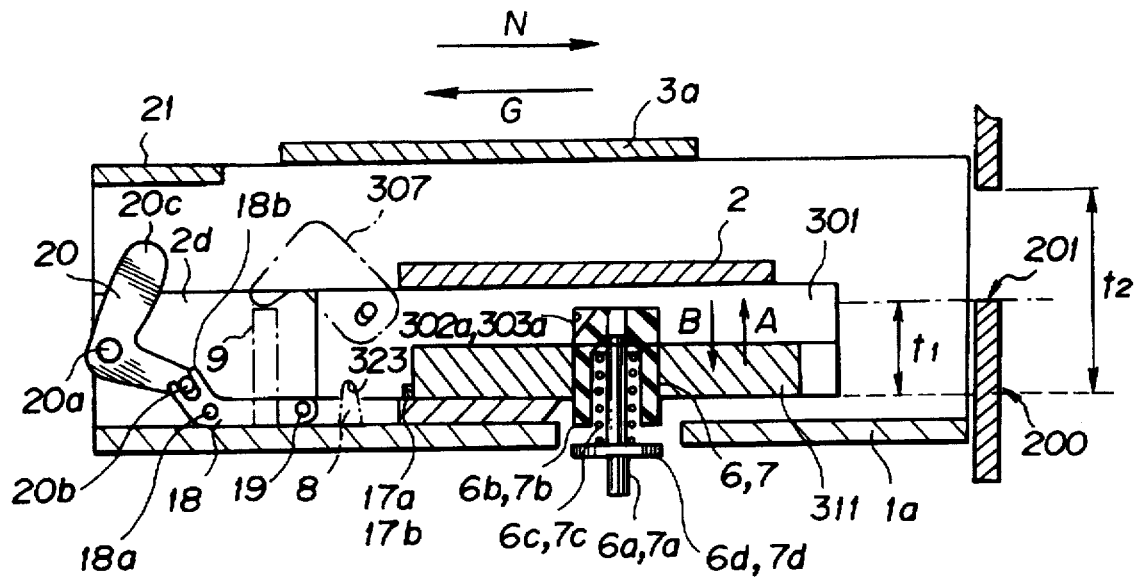
FIG. 9 is a cross sectional view showing the state of the reel shaft after completion of the tape cassette loading in the tape cassette positioning section.

With further movement of the cassette loading control frame 3, the cassette holder 2 is moved a predetermined amount $t_1$, which is less than t (FIGS. 5, 7 and 9) in a second direction normal to the bottom plate section 1a. Thus, as shown in FIG. 9, the engaging members 6b, 7b are inserted into and engaged with the reel shaft engaging openings 302a, 303a, while the positioning pin 8 is inserted into and engaged with the positioning opening 323 and the foremost part of the lid opening pin 9 abuts on the edge of the lid 307 to completely open the lid 307 to terminate the cassette loading.

With the above described cassette loading mechanism, on initiating cassette loading, the engaging members 6b, 7b of the reel shafts 6, 7 are thrusted or urged by the bottom plate 2e of the cassette holder 2 towards the proximal sides of the shanks 6a, 7a, that is towards the bottom plate 1a, by a predetermined amount lower than the usual height, such that, when the bottom plate 2e of the cassette holder 2 is moved parallel to the bottom plate section 1a, the engaging members 6b, 7b are moved towards the ends of the shanks 6a, 7a so as to be set to a usual height position. On the other hand, when the cassette holder 2 is shifted parallel to the bottom plate section 1a, the lid 307 is rotated a predetermined angle in the opening direction. As shown in FIG. 11, the edge of the tape 304 is further away from the bottom plate section 1a than the edge of the lid 307 in the opened position. Hence, if the lid 307 has been rotated by a predetermined angle, the tape cassette 300 may be moved horizontally, as shown in FIG. 12, with the tape member 304 not contacting the tape guides 70, 71, 72, 73 and with the lid 307 not contacting the tape guides 70, 71, 72, 73, while the tape cassette 300 is at the low position, that is in the proximate position to the bottom plate section 1a. That is, the displacement $t_1$ by which the cassette holder 2 is moved in a direction normal to the bottom plate section 1a of the chassis 1 may be less than the thickness t of the main body 301 of the tape cassette 300, in other words, the relation $t_1 < t$ may be satisfied.

Hence, the distance $t_2$ as measured from the upper surface of the cassette opening 201 to the cassette attachment surface may be lesser than twice the thickness t of the main body 301, in other words, the relation $t_2 < 2t$ is satisfied.

Figure 10:
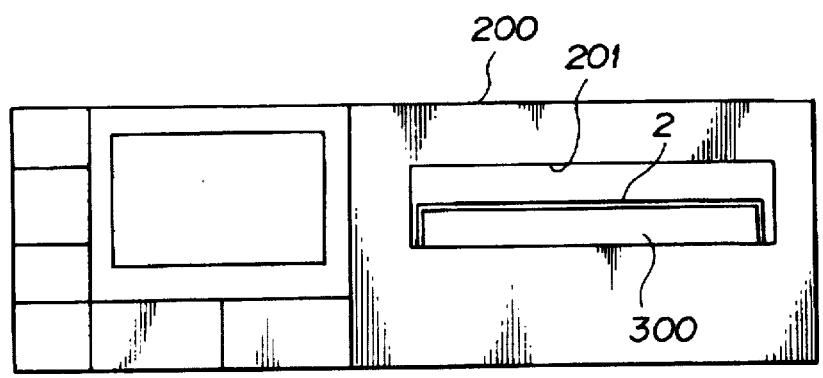
FIG. 10 is a front view showing the position of the cassette at the completion of the loading in a digital audio tape recorder according to the present invention.

Upon termination of loading of the tape cassette 300, the upper end of the main body 301 of the tape cassette 300 is slightly intruded into the cassette inserting opening 201, as shown in FIG. 10, to inhibit inadvertent insertion of another tape cassette by way of the cassette inserting opening 201, thus inhibiting dual insertion of tape cassettes 300.

Figure 18:
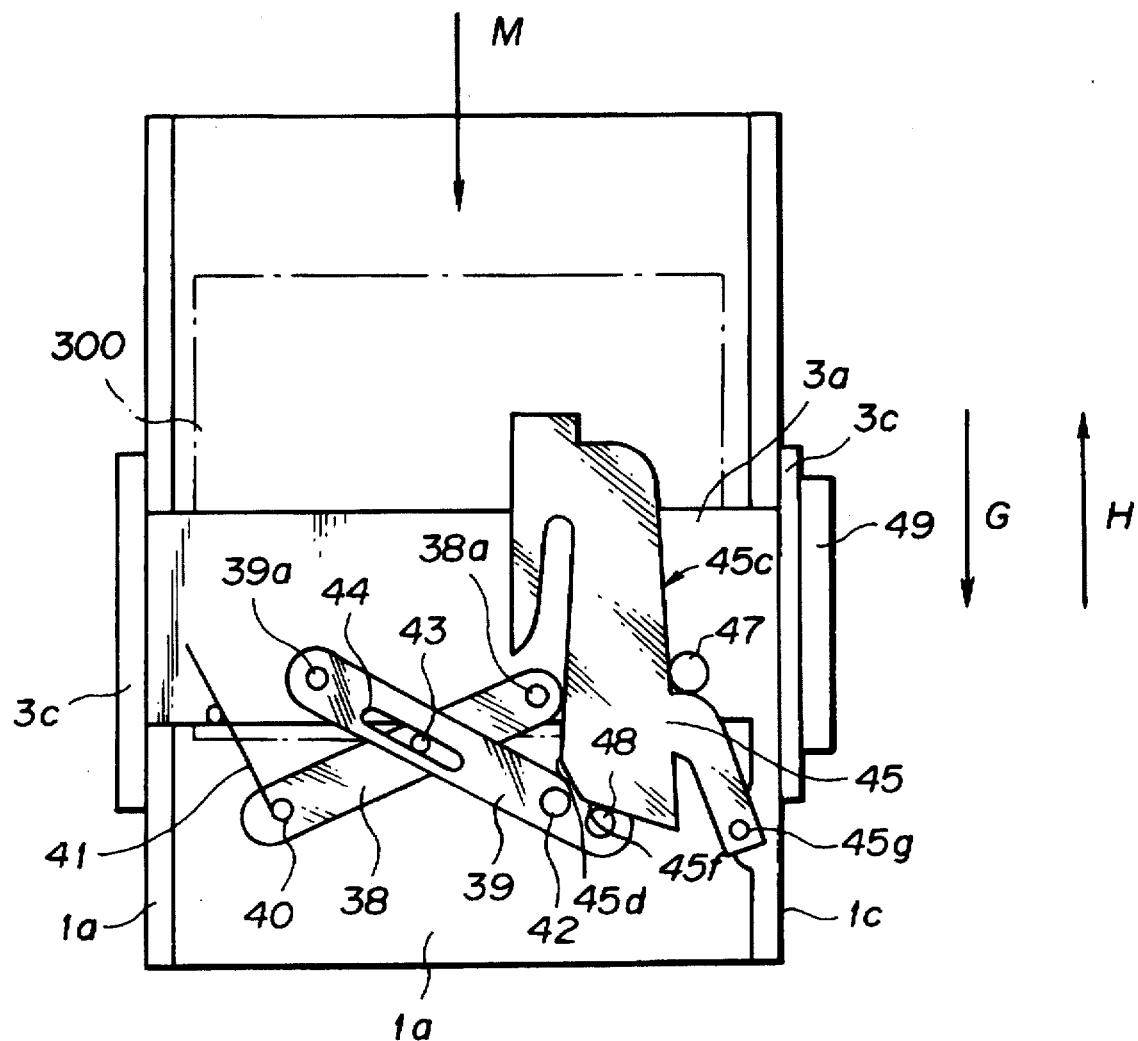
FIG. 18 is a top plan view showing the completed state of the cassette loading by the cassette loading mechanism.

Upon completion of cassette loading, the pin 48 reaches a rear bent edge 45f of the cam surface 45d, as shown in FIG. 18, and the cassette insertion detecting arms 38, 39 are rotated so that the cassette detecting pins 40, 42 are separated from the attached tape cassette 300 to maintain the cassette detecting pins 40, 42 out of contact with the magnetic head drum.

Meanwhile, after completion of the above-described loading of the tape cassette 300, the motor 51 continues its driving operation in the forward direction to continue the operation of the tape loading mechanism as later described. At this time, as shown in FIG. 21, rotation of the first flanged gear 64 is discontinued, with the gear 64 facing the toothless section 63a of the first interrupted gear 63 and with the flanged section 64a of the first flanged gear 64 being supported by the guide section 63b of the first interrupted gear 63 through a predetermined angle $d_1$. Thus, the movement of the cassette holder 2 and the cassette loading control frame 3 in the direction shown by an arrow G in FIG. 19B that is towards the inside of the housing, for realizing the tape cassette loading, is discontinued.

At the time of taking out or ejecting the loaded tape cassette 300 from the tape recorder, which is reverse to the tape cassette loading operation, the motor 51 is driven in the reverse direction. Thus, the cassette loading control frame 3 is moved rearwards, that is in the direction shown by the arrow H in FIGS. 5 and 6. When the cassette holder 2 is moved in a direction away from the bottom plate section 1a, the second lid actuating lever 20 is rotated in the direction shown by the arrow E in FIGS. 6 and 12, in abutment with the lower surface of the lid actuating member 21, while the first lid operating lever 18 is rotated simultaneously. Thus, the lid 307 is rotated a predetermined angle, as shown in FIG. 12.

When the cassette loading control frame 3 is shifted in the direction shown by an arrow H in FIG. 12, that is towards the cassette inserting opening 201 or towards the aforementioned one lateral surface, the cassette holder 2 is moved in a direction parallel to the bottom plate section 1a. During the time the other end of the second lid operating lever 20 abuts on the lid operating member 21, the lid 307 is kept at the position in which it has been rotated a predetermined angle and in which it is out of contact with the tape guides. On the other hand, when the cassette loading control frame 3 is moved from the position shown in FIG. 8 towards the rear, as indicated by the arrow H in FIG. 8, the engaging members 6b, 7b of the reel shafts 6, 7 are urged by the edge of plate 2e towards the bottom plate 1a of the forward opening 2a of the cassette holder 2 in the direction shown by the arrow in FIG. 7. The edge of the bottom plate 2e of the cassette holder 2 is previously subjected to a so-called C-chamfering or R-chamfering to facilitate the thrusting or urging of the engaging members 6b, 7b.

When the cassette holder 2 is moved further forwards parallel to the bottom plate section 1a, the second lid operating lever 20 is brought to a position out of abutment with the lid actuating member 21, so that the lid 307 is closed automatically.

With the above-mentioned movement of the cassette loading frame 3, the cam plate 45 is also rotated, at the same time that the cassette insertion detecting arms 38, 39 are rotated. Thus, the cam plate 45 is rotated to a position in which the stop pin 47 abuts on and engages with the stop cam surface 45a, as shown by an arrow K in FIG. 14, to inhibit rearward movement of the cassette loading frame 3. As a result of such rotation of the cam plate 45, the cassette insertion detecting arms 38, 39 are rotated in the direction shown by arrows I and J in FIG. 14, the cassette detecting pins 40, 42, functioning to thrust the tape cassette out of the cassette inserting openings 201. At this time, the bottom cover 311 is moved towards the lid 307 on the main body 301 to close the reel shaft inserting openings 309, 310 to complete the ejecting operation.

The tape loading mechanism provided within the tape recorder function to extract the tape 304 of the loaded tape cassette out of the main body 301 and to guide the tape along a predetermined tape path to wind it on a magnetic head guide drum 68 provided on the bottom plate section 1a of the chassis 1. This tape loading mechanism includes a plurality of tape guides movable on the bottom plate section 1a from a position within a tape extracting section 314 from the loaded tape cassette to a position outside of the cassette body 301.

Figure 22:
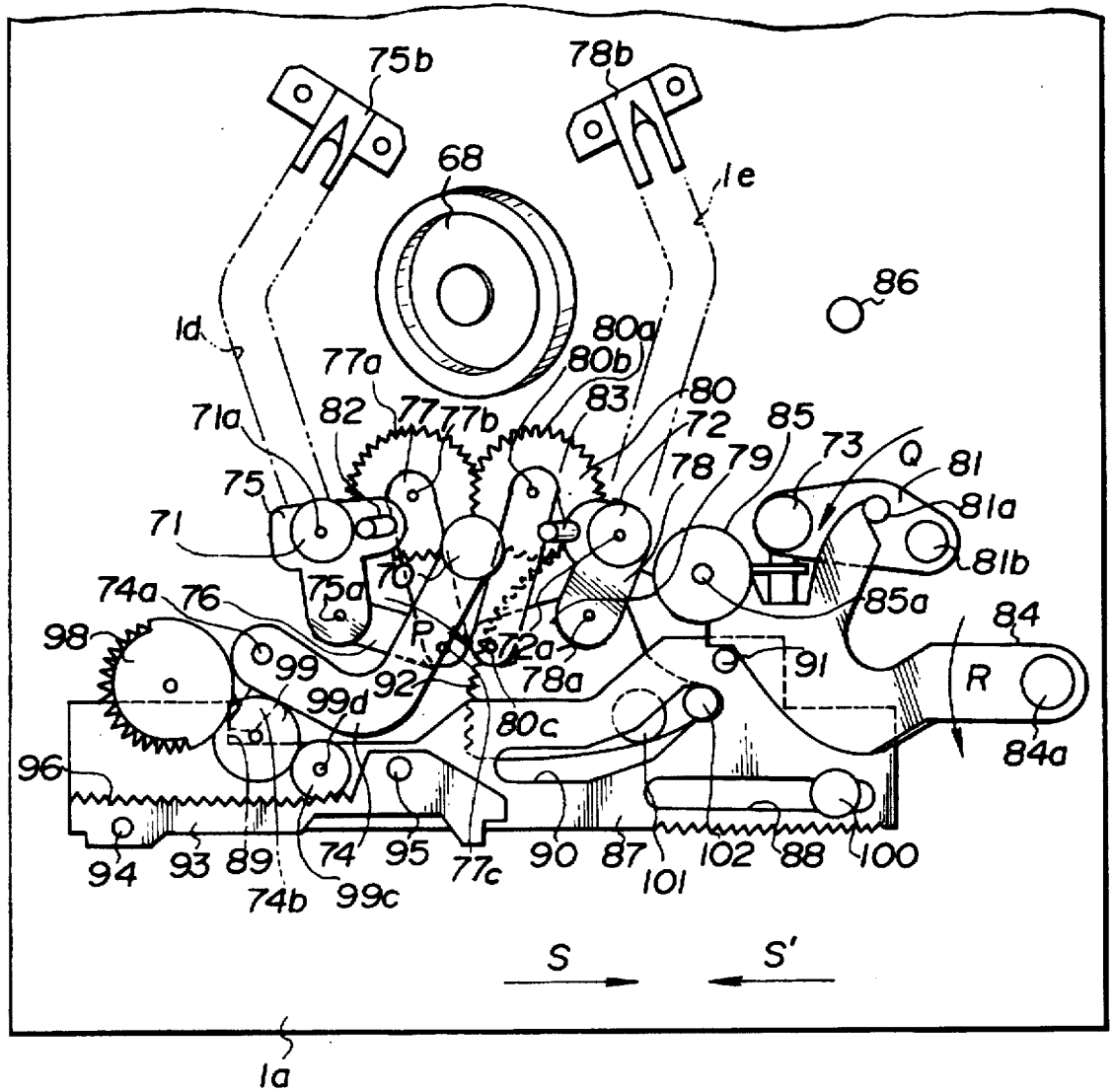
FIG. 22 is a plan view showing the starting state of tape loading by the loading mechanism.

Referring to FIG. 22, these tape guides include a first guide roll 70, a second guide roll 71, a third guide roll 72, a tape pin 73, a first inclined guide pin 82, and a second inclined guide pin 83. The tape guide pin 73 and the inclined tape guide pins 82, 83 are cylindrical so as to permit the tape 304 to be wound thereon, while the first to third guide rolls 70, 71, 72 are similarly cylindrical so as to permit the tape 304 to be wound thereon, while being rotatable about their own axes.

The first guide roll 70 is provided on one end of a guide roll supporting arm 74 having its proximal end 74a rotatably supported on the bottom plate section 1a. This guide roll supporting arm 74 is rotationally biased by a spring member, not shown, in a direction indicated by an arrow P in FIG. 22, which is a direction in which the first guide roll 70 is disposed within the tape extracting section 314.

The second guide roll 71 is mounted for rotation on a first guide roll supporting base 75 by means of a supporting shaft 71a.

With rotation of a first loading gear 77a rotatably mounted on the bottom plate 1a by means of a supporting shaft 77b, the first guide roll supporting base 75 is moved by a pair of intermediate link members 77, 76 along a first guide roller groove 1d formed in the bottom plate section 1a. Thus, the first guide roll supporting base 75 is rotatably mounted on the end of the first intermediate link member 76 by a supporting shaft 75a. The first intermediate link member 76, to which the first guide roll supporting base 75 is mounted, is rotatably mounted by having its proximal end rotatably supported by a supporting shaft 77c provided to the foremost part of the second intermediate link member 77. The second link member 77 is rotatably mounted on the bottom plate 1a at its proximal end by a supporting shaft 77b provided on the bottom plate section 1a. At the proximal end of the second intermediate link member 77, the first loading gear 77a for rotating the second intermediate link member 77 is mounted integrally with the second intermediate link member 77 and coaxially with the supporting shaft 77b.

The third guide roll 72 is rotatably mounted on a second guide roll supporting base 78 by means of a supporting shaft 72a.

By rotation of a second loading gear 80a, mounted rotatably on the bottom plate 1a by means of a supporting shaft 80b, the second guide roll supporting base 78 is moved, similarly to the first guide roll supporting base 75, by means of a pair of intermediate link members 80, 79, along a second guide groove 1e provided in the bottom plate section 1a. Thus, the second guide roll supporting base 78 is rotatably mounted on the forward side of the third intermediate link member 79 by means of a supporting shaft 78a. This third link member 79 is mounted for rotation relative to the fourth intermediate link member 80 by having its proximal end rotatably mounted on a supporting shaft 80c (FIG. 23) mounted on the end of the fourth intermediate link member 80. This fourth intermediate link member 80 is rotatably supported about a center of rotation at its proximal end by a supporting shaft 80b provided on the bottom plate section 1a. On the proximal end of this fourth intermediate link member 80, the second loading gear 80a for rotating the fourth intermediate link member 80 is mounted integrally with the fourth intermediate link member 80 coaxially with the supporting shaft 80b.

The tape guide pin 73 is mounted upright on the foremost side of a guide pin supporting arm 81 which is rotatably mounted on the bottom plate section 1a by a supporting shaft 81b. This guide pin supporting arm 81 is rotationally biased in the direction shown by arrow Q in FIG. 22 so that the tape guide pin 73 is positioned in the inside of the tape extracting section 314.

The first and second inclined guide pins 82, 83 are provided with a predetermined inclination on the first and second guide roll supporting bases 75, 78.

On the forward side of a pinch roll supporting arm 84, which is rotatably mounted on the bottom plate section 1a by means of a supporting shaft 84a, a pinch roll 85 is mounted rotatably by means of a supporting shaft 85a. This pinch roll 85 is movable from the position within the tape extracting section 314 to a position of abutting on a capstan shaft 86 which is provided on the bottom plate section 1a and which is rotated at a predetermined speed. This pinch roll supporting arm 84 is rotationally biased by a spring member, not shown, in the direction R.

In this manner, the guide rolls 70, 71, 72, the tape guide pin 73, the inclined pins 82, 83 and the pinch roll 85 are movably supported on the bottom plate 1a.

The guide roll supporting arm 74 supporting the first guide roll 70, the loading gears 77a, 80a for shifting the first and second guide roll supporting bases 75, 78, the guide pin supporting arm 81 supporting the tape guide pin 73 and the roll supporting arm 84 supporting the pinch roll 85, are rotated by the movement of a tape loading control cam 87 in the direction shown by an arrow S in FIG. 22.

This tape loading control cam 87 is mounted on the chassis 1a by having a mounting pin 100 mounted upright on the bottom plate 1a introduced into a mounting slide guide slot 88, so as to be moved in reciprocation in the left and right direction or in the directions shown by arrows S and S' in FIG. 22. This tape loading control cam 87 is provided with a guide roll operating cam surface 89 for rotating the guide roll supporting arm 74, a guide roll operating cam groove 90 for rotating the second loading gear 80a and a pinch roll operating pin 91 for rotating the pinch roll supporting arm 84.

Figure 23:
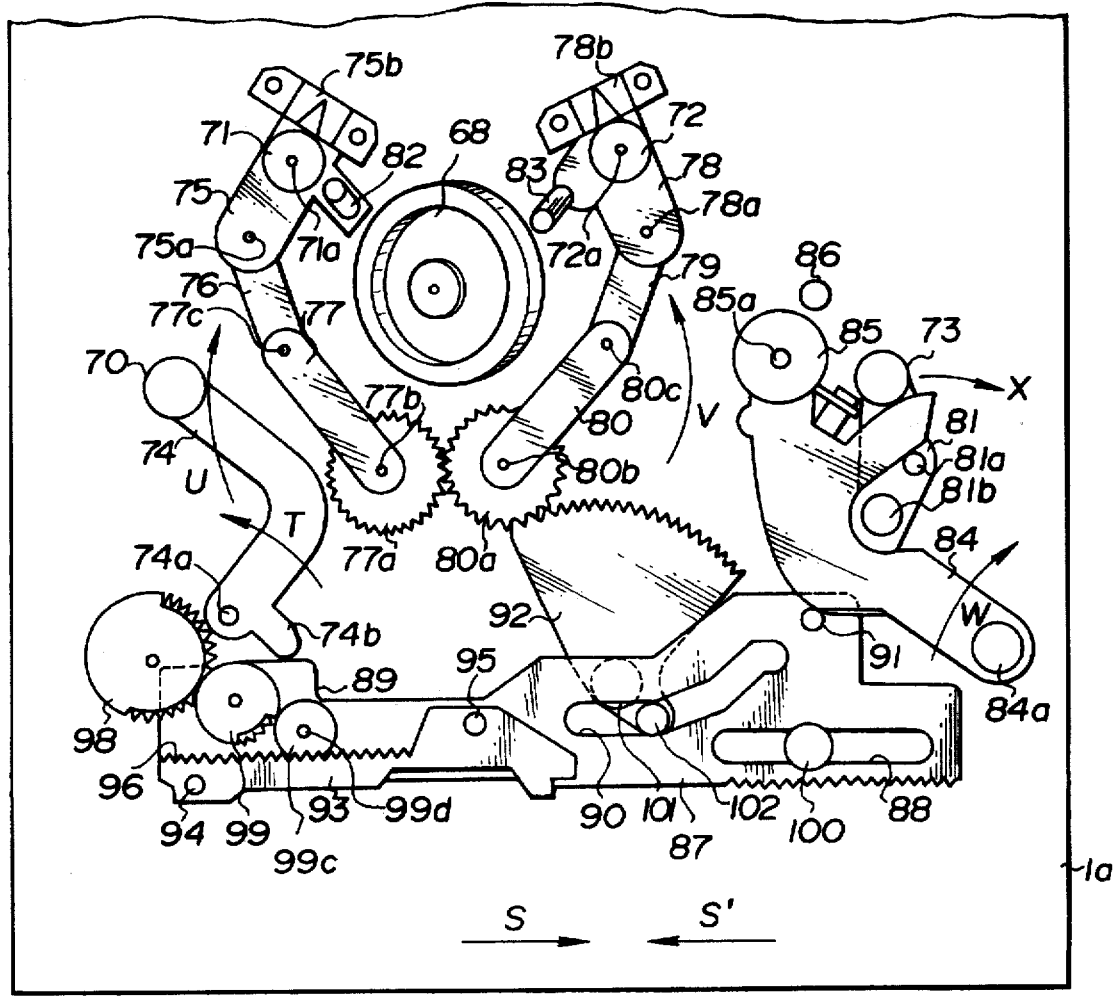
FIG. 23 is a plan view showing the completed state of tape loading by the tape loading mechanism.

When the tape loading control cam 87 is moved from the position shown in FIG. 22 towards right or in the direction shown by an arrow S, a projection 74b (FIG. 23) on the proximal side of the guide roll supporting arm 74 is thrusted against the guide roll actuating cam surface 89, so that the supporting arm 74 is rotated in the direction shown by an arrow T in FIG. 23 against the bias of a spring member, not shown.

In the guide roll actuating cam groove 90 formed in the tape loading control cam 87 is engaged a pin 102 extending upright on the proximal side of a sector gear 92, which is rotatably supported on the bottom plate section 1a by means of a supporting shaft 101 to mesh with the second loading gear 80a. When the tape loading control gear 87 is shifted from the position of FIG. 22 towards the right, as indicated by an arrow S, the sector gear 92 and, hence, the second loading gear 80a meshing with the sector gear, are rotated, as shown in FIG. 23, while the first loading gear 77a meshing with the second loading gear 80a is also rotated in timed relating therewith.

When the tape loading control cam 87 is shifted from the position shown in FIG. 22 towards the right, as shown by the arrow S, the pinch roll supporting arm 84 is thrusted by the pin 91, as shown in FIG. 23, and is thereby rotated in the direction shown by the arrow W in FIG. 23 against the bias of a spring member, not shown. When thus rotated, the pinch roll supporting arm 84 abuts on a pin 81a of the guide pin supporting arm 81 to rotate the arm 81 in the direction shown by an arrow X in FIG. 23.

Figure 27:
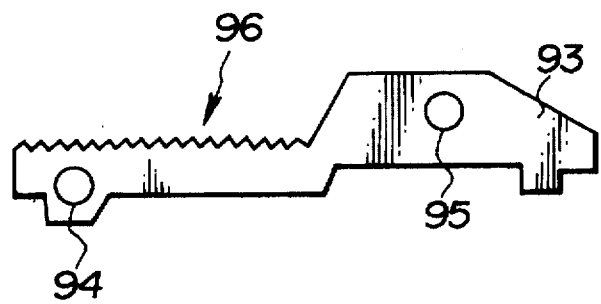
FIG. 27 is a plan view showing the profile of a control cam actuating plate of the tape loading mechanism.

On the tape loading control cam 87 is mounted a control cam actuating plate 93 which is shaped, as shown in FIG. 27, and mounted on the tape loading control cam 87 by a pair of set screws 94, 95. On one lateral side of this control cam actuating plate 93 is mounted a control cam operating rack 96. This control cam actuating plate 93 is moved along with the tape loading control cam 87 by the driving power of the drive motor 51 being transmitted to the control cam actuating rack 96 by way of a plurality of transmission gears.

Figure 19B:
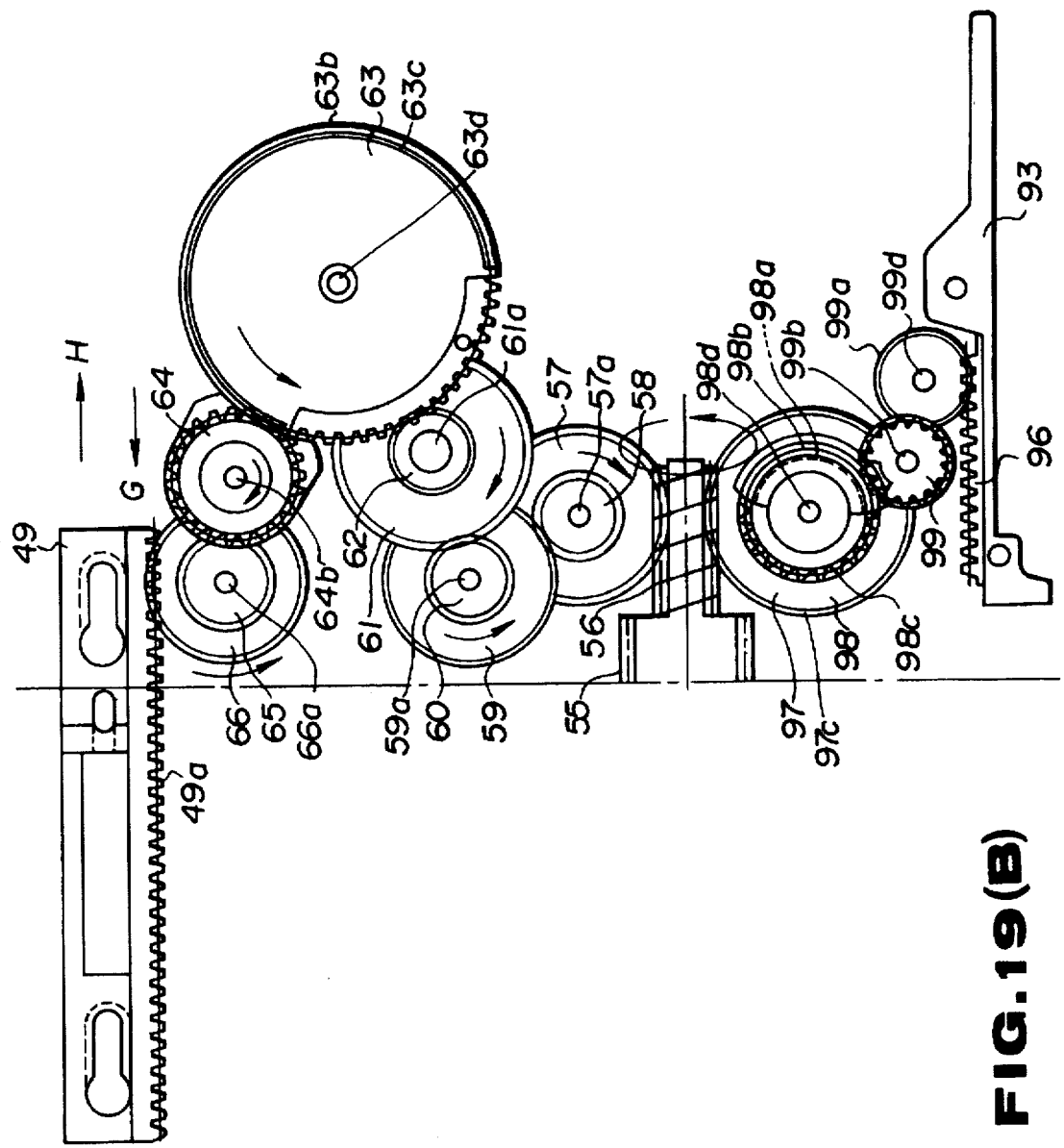
Figure 19C:
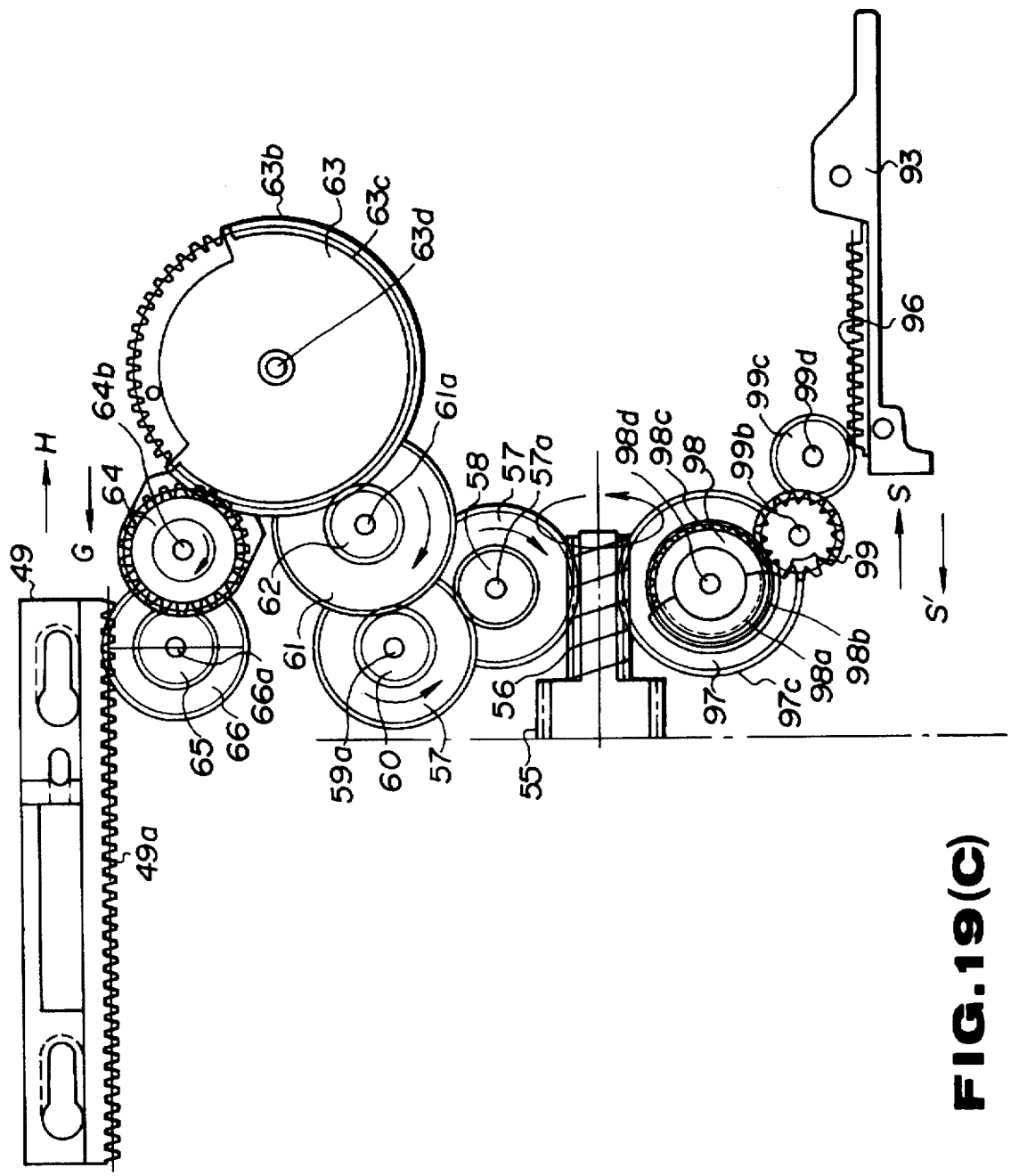
Figure 19D:
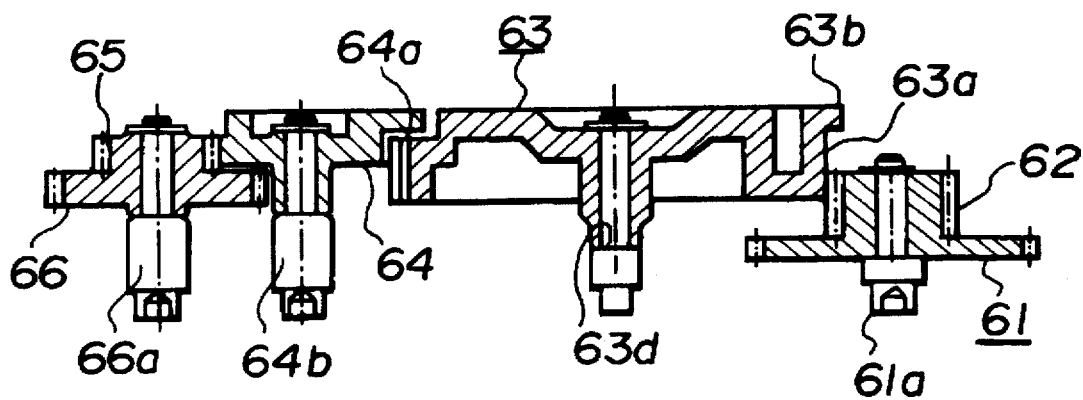

Referring to FIGS. 19A, 19B and 19C, the drive power transmitting gearing, comprised of plural gears, for transmitting the drive power of the motor 51 to the control cam operating rack 96, includes a second worm wheel 97 which is rotatably supported by means of a shaft 98d and has a peripheral gear 97c meshing with the transmission worm gear 56. On the upper surface of the second worm wheel 97, a second interrupted tooth gear 98 is mounted integrally and coaxially therewith and meshes with a second flanged gear 99 which may be rotated about a shaft 99b as the center of rotation. This second flanged gear 99 meshes with a tenth transmission gear 99c rotatable about a shaft 99d and the tenth transmission gear 99c meshes with the control cam actuating rack 96.

Figure 28:
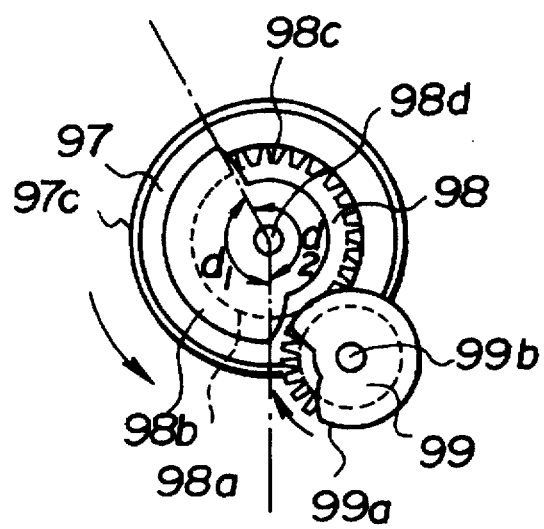
FIG. 28 is a plan view showing the state in which the interrupted gear of the tape loading mechanism side gearing meshes with the flanged gear.
Figure 29:
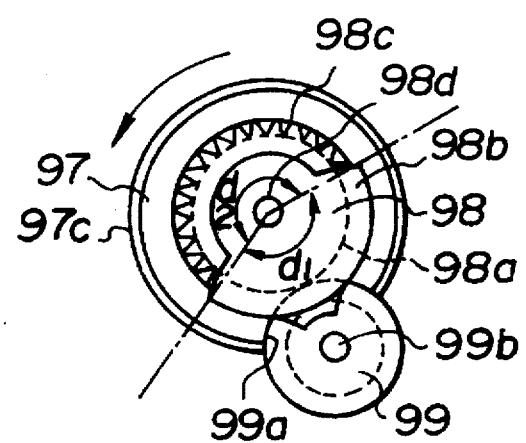
FIG. 29 is a plan view showing the state in which the flanged gear is supported in the halted state by the interrupted gear.

Referring to FIGS. 28 and 29, the second interrupted tooth gear 98 is provided at a lower step thereof with a toothless section 98a which is devoid or free of teeth over a predetermined angle $d_1$ and a flanged guide section 98b corresponding with the toothless section 98a.

Referring to FIG. 29, the second flanged gear 99 has an integral flange 99a abutting on the guide section 98b when facing the toothless section 98a of the second interrupted gear 98 to maintain the gear 99 in the stationary state.

With the above described tape loading mechanism, when the cassette loading is terminated by the above-mentioned cassette loading mechanism, the tape 304 starts to be extracted from the loaded tape cassette.

At this time, the second worm wheel 97, the second interrupted gear 98, the second flanged gear 99 and the tenth transmission gear 99c, making up the gearing of the tape loading mechanism side, are at the relative positions shown in FIG. 19B.

Thus, during cassette loading, the driving motor 51 is driven in the forward direction shown by the arrow in FIG. 19. The transmission worm gear 56, the first interrupted gear 63 and the first flanged gear 64 are rotated sequentially to shift the rack gear 49 mounted on the cassette loading control frame 3 in the direction shown by the arrow G in FIG. 19. Although the second worm wheel 97 and the second interrupted gear 98 are rotated at this time, the second flanged gear 99 is facing the interrupted or toothless section 98a of the second interrupted gear 98, and, as shown in FIG. 29, the flange 99a of the second flanged gear 99 is supported by the guide section 98b of the second interrupted gear 98 throughout the angular extent $d_1$ to maintain the gear 99 in the stationary position.

After termination of cassette loading, the toothed section 98c of the second interrupted gear 98 is at the position of meshing with the second flanged gear 99, as shown in FIG. 19B. At this time, the guide rolls 70, 71, 72, the tape guide pin 73, the inclined guide pins 82, 83 and the pinch roll 85 are positioned more inwardly in the main body 301 than the tape 304, that is, within the tape extracting section 314, as shown in FIG. 22. When the motor 51 continues its driving operation in the forward direction, the transmission worm 56 is rotated to start rotation of the second flanged gear 99, as shown in FIG. 28.

By rotation of the second flanged gear 99, the control cam actuating plate 93 and the tape loading control cam 87 are moved towards the right, as indicated by the arrow S in FIG. 23, by means of the tenth transmission gear 99c. By the movement of the tape loading control cam 87, the guide roll supporting arm 74 is rotated in the direction shown by the arrow T in FIG. 23 to shift the first guide roll 70 to a predetermined position. The sector gear 92 is rotated, while the first and second loading gears 77a, 80a are rotated in the directions shown by arrows U and V, respectively, the guide roll supporting bases 75, 78 abutting on catchers 75b, 78b, respectively, and being positioned on both sides of the magnetic head drum 68. The pinch roll supporting arm 84 is rotated in the direction shown by an arrow W in FIG. 23, while the pinch roll 85 is moved to a predetermined position in the vicinity of the capstan shaft 86. By such rotation of the pinch roll supporting arm 84, the guide pin supporting arm 81 is rotated in the direction shown by the arrow X in FIG. 23 to shift the tape guide pin 73 to a predetermined position.

In this manner, the tape 304 is extracted out of the cassette body 301 so as to be guided on a predetermined tape running path.

At this time, the pinch roll 85 is not in contact with the capstan shaft 86. Thus, the tape recorder provided with the tape loading mechanism is in the so-called stop mode. Also, by stopping the driving of the motor 51, and selectively rotating one of the reel shafts 6, 7 at a fast speed by a reel motor, not shown, the tape recorder may be set to a so-called rewind (REW) or fast forward (FF) mode.

Figure 24:
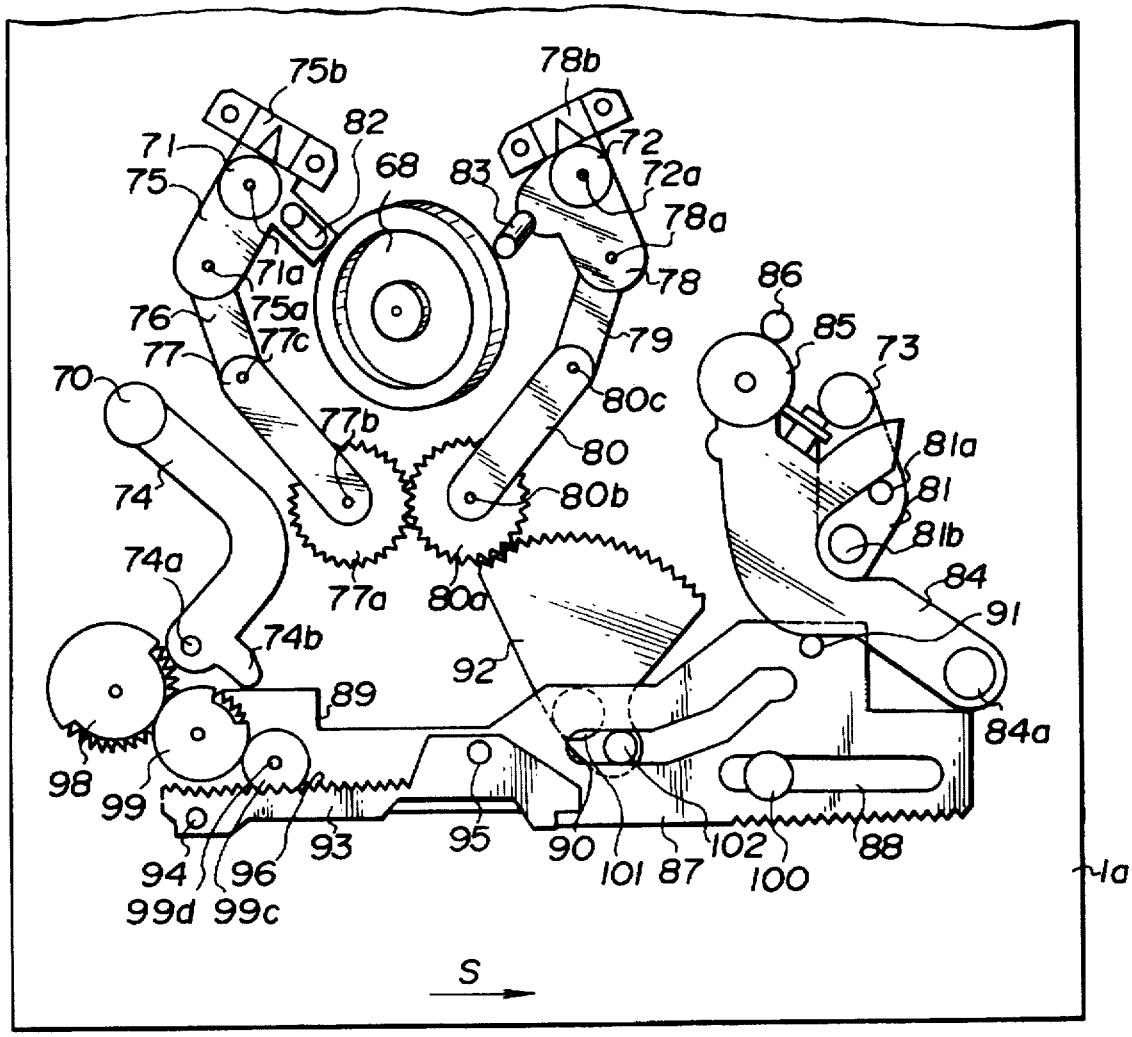
FIG. 24 is a plan view showing the state of the forward side of the tape loading mechanism as set to the recording and/or reproducing mode.

With further driving operation of the motor 51 in the forward direction, the tape loading control cam 87 is moved further towards the right, as indicated by the arrow S in FIG. 24. With further rotation of the pinch roll supporting arm 84 in the direction W in FIG. 24, the pinch roll 85 is pressed against the capstan shaft 86. At this time, the guide roll 70, the tape guide pin 73 and the guide roll supporting bases 75, 78 cannot be moved further by movement inhibit means. The tape recorder can then be set to a so-called forward (FW) mode for performing recording and/or reproduction by rotating the capstan shaft 86 in the forward direction and the reel shaft 6 in the rewind direction by a separate capstan motor, not shown, for feeding the tape 304 in the forward direction.

At this time, the second worm wheel 97, the second interrupted gear 98, the second flanged gear 99 and the tenth transmission gear 99c, making up the gearing on the side tape loading mechanism, are at the relative position, as shown in FIG. 19C.

Figure 25:
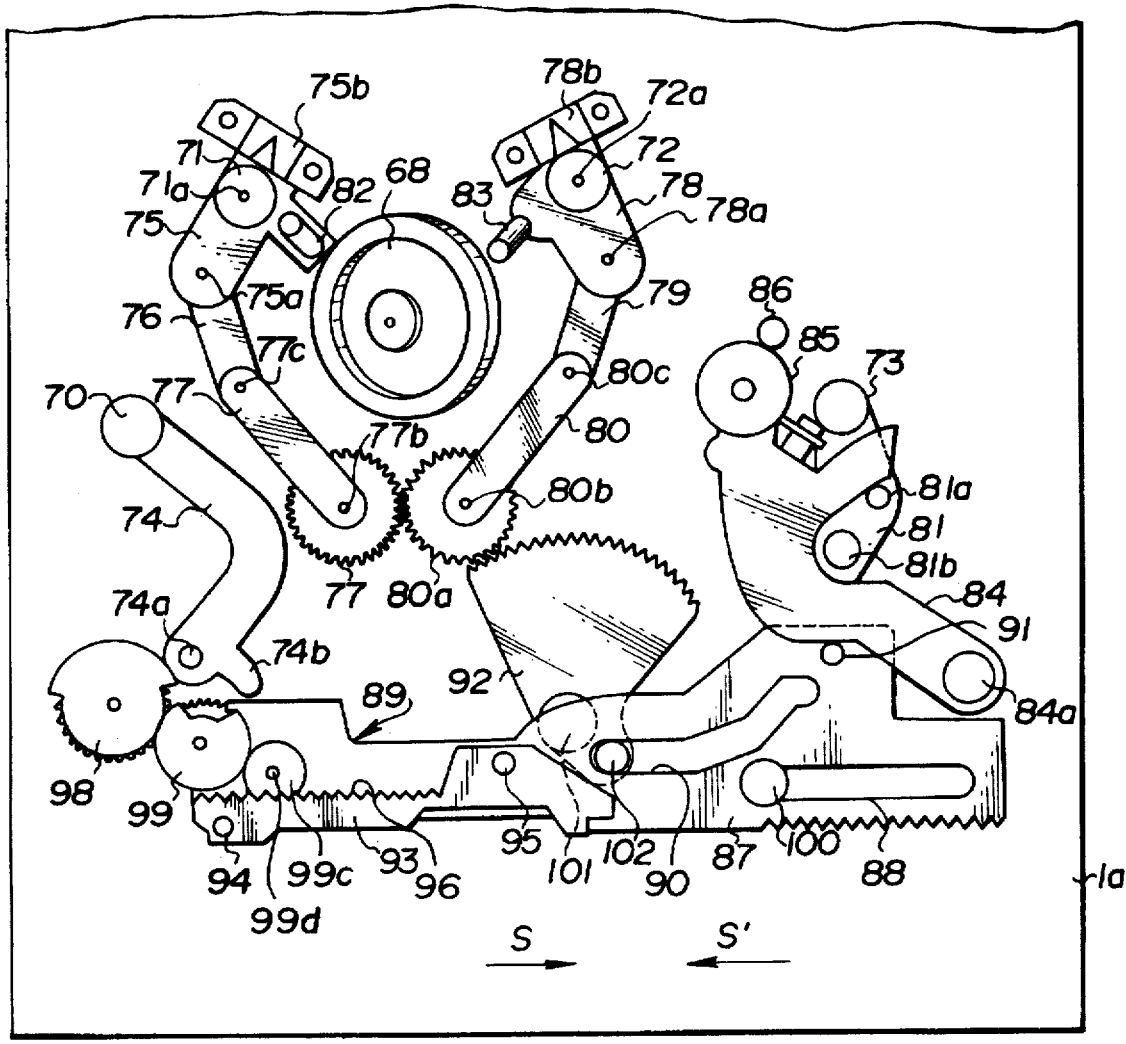
FIG. 25 is a plan view showing the state of the reverse side of the tape loading mechanism as set to the recording and/or reproducing mode.
Figure 26:
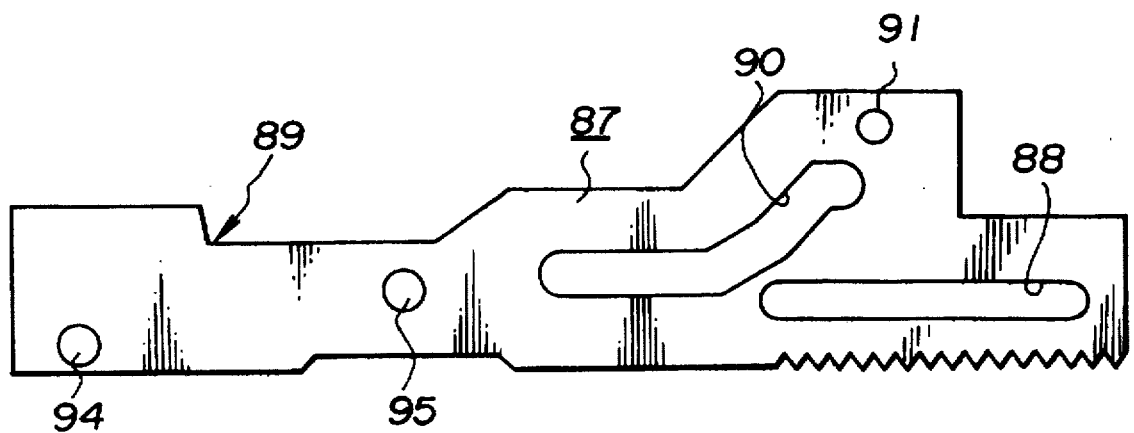
FIG. 26 is a plan view showing the profile of the tape loading control cam of the tape loading mechanism.

With further forward rotation of the motor 51, the tape loading control cam 87 is moved towards the right, as shown by the arrow S in FIG. 25. At this time, a mode switching device, not shown, of the tape recorder is actuated by the tape loading control cam 87 to cause rotation of the capstan shaft 86 in the reverse direction and rotation of the tape 104 in the rewind direction by the operation of the capstan motor, not shown.

That is, the mode switching between the forward mode, the reverse mode, the stop, fast feed and the rewind modes may be realized by driving the motor 51 in the forward or rearward direction by a predetermined amount.

When the tape recorder is set to a so-called eject mode, the tape loading mechanism performs a so-called unloading of withdrawing the tape 304 into the inside of the main body 301. That is, by driving the motor 51 in the reverse direction, the control cam actuating plate 93 and the tape loading control cam 87 are moved in the direction shown by the arrow S' and, as shown in FIG. 22, the guide rolls 70, 71, 72, the tape guide pin 73, the inclined pins 82, 83 and the pinch roll 185 are moved into the inside of the tape extracting section 314, whereas, by rotating a predetermined one of the reel shafts 6, 7 in the predetermined direction to take up the tape 304, the loaded tape is withdrawn into the inside of the main body 301.

After termination of this unloading operation, the motor 51 is driven in the reverse direction to actuate the cassette loading mechanism in reverse to complete the ejecting operation.

In the tape recorder in which the above described tape loading mechanism is employed, both the cassette loading and the tape loading are performed by a single electric motor by employing two series of transmission means, each including an interrupted gear.

It is to be noted that the present invention may be applied not only to a so-called digital audio tape recorder, as described hereinabove, but to a video tape recorder, for example, in which the tape is extracted from the tape cassette to effect recording and/or reproduction.

Although various minor modifications may be suggested by those versed in the art, it should be understood that we wish to embody within the scope of the patent granted hereon all such modifications as reasonably and properly come within the scope of our contribution to the art.

We claim:

1. A recording/reproducing apparatus for a tape cassette having a case containing a magnetic tape wound on a pair of tape reels, said cassette having an outer front side of the case with a tape opening through which the magnetic tape is extracted, said cassette having a rotatable lid covering at least a front side of the magnetic tape positioned over said tape opening, said cassette having a pair of tape reel openings on a lower surface of the case and a slider movable from a first slider position closing the reel openings and a bottom opening adjacent the tape opening to a second slider position opening the bottom opening and reel openings; said apparatus comprising an apparatus housing having a cassette insertion opening; a pair of reel shaft means being disposed in the apparatus housing for engaging the tape reels of the tape cassette; driving means having a single electric motor being rotatable in both a forward and a reverse direction; cassette transfer means having frame means for holding the tape cassette therein, said frame means being movable in a first direction normal to said reel shaft means from a first position registering with the cassette insertion opening to an intermediate position, and being movable in a second direction parallel to the reel shaft means from the intermediate position to a second position in which the pair of reel shaft means of the apparatus engage the pair of tape reels, said frame means having a bottom plate surface with means for engaging the slider and moving the slider from the first slider position to the second slider position as the cassette is inserted into the frame means in said first direction, said cassette transfer means including means for opening/closing said lid when said frame means moves along the first direction; first drive power transmitting means for transmitting a drive power from said driving means to said cassette transfer means to move the frame means between said first and second positions, said first drive power transmitting means including first selection means for selectively transmitting the drive power through said first drive power transmitting means to said cassette transfer means, said first selection means being a first rotatable interrupted gear means having a first step having teeth at least along an entire periphery thereof and a second step having a first toothless section over a predetermined angular extent and a first toothed section and being integral with said first step, said first step and the first drive power transmitting means meshing with each other to drive said first interrupted gear means into rotating and said cassette transfer means being intermittently engaged with and driven by said second step; movable tape loading control means being disposed in the apparatus for driving and controlling tape loading means and at least extracting the magnetic tape in said tape cassette and guiding an extracted portion of the tape along a predetermined tape path in said apparatus; and second drive power transmitting means for transmitting the drive power from said driving means to said tape loading control means to activate said tape loading control means, said second drive power transmitting means including second selection means for selectively transmitting the drive power through said second drive power transmitting means to said tape loading control means.

2. A recording/reproducing apparatus according to claim 1, wherein said first selection means comprises an integral third step having a first flange over a predetermined angular extent at least registering with said first toothless section.

3. A recording/reproducing apparatus according to claim 2, comprising rotatable third drive power transmitting means positioned between said cassette transfer means and said first selection means and being intermittently engaged with said second step of said first selection means and also being engaged with said second step of said first selection means and also being engaged with said cassette transfer means.

4. A recording/reproducing apparatus according to claim 3, wherein said third drive power transmitting means is formed integrally with a second flange intermittently registering with and abutting on said first flange.

5. A recording/reproducing apparatus for a tape cassette having a case containing a magnetic tape wound on a pair of tape reels, said cassette having an outer front side of the case with a tape opening through which the magnetic tape is extracted, said cassette having a rotatable lid covering at least a front side of the magnetic tape positioned over said tape opening, said cassette having a pair of tape reel openings on a lower surface of the case and a slider movable from a first slider position closing the reel openings and a bottom opening adjacent the tape opening to a second slider position opening the bottom opening and reel openings; said apparatus comprising an apparatus housing having a cassette insertion opening; a pair of reel shaft means being disposed in the apparatus housing for engaging the tape reels of the tape cassette; driving means having a single electric motor being rotatable in both a forward and a reverse direction; cassette transfer means having frame means for holding the tape cassette therein, said frame means being movable in a first direction extending normal to said reel shaft means from a first position registering with the cassette insertion opening to an intermediate position, and being movable in a second direction parallel to the reel shaft means from the intermediate position to a second position in which the pair of reel shaft means of the apparatus engage the pair of tape reels, said frame means having a bottom plate surface with means for engaging the slider and moving the slider from the first slider position to the second slider position as the cassette is inserted into the frame means in said first direction, said cassette transfer means including means for opening/closing said lid when said frame means moves along the first direction; first drive power transmitting means for transmitting a drive power from said driving means to said cassette transfer means to move the frame means between said first and second positions position, said first drive power transmitting means including first selection means for selectively transmitting the drive power through said first drive power transmitting means to said cassette transfer means; movable tape loading control means being disposed in the apparatus for driving and controlling tape loading means and at least extracting the magnetic tape in said tape cassette and guiding an extracted portion of the tape along a predetermined tape path in said apparatus; and second drive power transmitting means for transmitting the drive power from said driving means to said tape loading control means to activate said tape loading control means, said second drive power transmitting means including second selection means for selectively transmitting the drive power through said second drive power transmitting means to said tape loading control means, said second selection means having a rotatable second interrupted gear means having a first step having teeth at least along an entire periphery thereof and a second step having a second toothless section over a predetermined angular extent and a second toothed section and being integral with said first step, said first step and the second drive power transmitting means meshing with each other to drive said second interrupted gear means into rotating and said tape loading control means being intermittently engaged with and driven by said second step.

6. The recording/reproducing apparatus according to claim 5, wherein said second selection means comprises an integral third step having a third flange over a predetermined angular extent at least registering with said second toothless section.

7. A recording/reproducing apparatus according to claim 6, comprising rotatable fourth drive power transmitting means positioned between said tape loading control means and said second selection means and being intermittently engaged with said second step of said second selection means and also being engaged with said tape loading control means.

8. A recording/reproducing apparatus according to claim 7, wherein said first selection means include a first toothed section, a first toothless section and a third drive power transmitting means being positioned so that as said first toothed section faces said third drive power transmitting means, said second toothless section faces said fourth drive power transmitting means and, as said first toothless section faces said third drive power transmitting means, said second toothed section opposes said fourth drive power transmitting means.

9. A recording/reproducing apparatus according to claim 7, wherein said fourth drive power transmitting means is formed integrally with a fourth flange intermittently registering with and abutting on said third flange.

10. A recording/reproducing apparatus according to claim 9, wherein said first selection means includes a first flange and a second flange being positioned so that as said first flange and said second flange face each other, said third flange and said fourth flange are out of abutment with each other and, as said third flange and said fourth flange face and abut each other, said first flange and said second flange are out of abutment with each other.

* * * * *